United States Patent
Huang et al.

(10) Patent No.: US 9,815,018 B2
(45) Date of Patent: Nov. 14, 2017

(54) GAS SEPARATION DEVICE AND PACKING

(71) Applicant: IHI Corporation, Koto-ku (JP)

(72) Inventors: Jian Huang, Tokyo (JP); Yoshiyuki Iso, Tokyo (JP); Mariko Katou, Tokyo (JP); Shinsuke Matsuno, Tokyo (JP); Kenji Takano, Tokyo (JP); Naoki Fujiwara, Tokyo (JP); Atsushi Murakami, Tokyo (JP)

(73) Assignee: IHI Corporation, Koto-ku (JP)

( * ) Notice: Subject to any disclaimer, the term of this patent is extended or adjusted under 35 U.S.C. 154(b) by 170 days.

(21) Appl. No.: 14/600,690

(22) Filed: Jan. 20, 2015

(65) Prior Publication Data

US 2015/0137393 A1 May 21, 2015

Related U.S. Application Data

(63) Continuation of application No. PCT/JP2013/051588, filed on Jan. 25, 2013, and a
(Continued)

(51) Int. Cl.
*B01D 53/18* (2006.01)
*B01D 53/62* (2006.01)
(Continued)

(52) U.S. Cl.
CPC ....... *B01D 53/185* (2013.01); *B01D 53/1475* (2013.01); *B01D 53/1493* (2013.01);
(Continued)

(58) Field of Classification Search
CPC .............. B01D 53/185; B01D 53/1475; B01D 53/1493; B01D 53/62; B01D 2252/103;
(Continued)

(56) References Cited

U.S. PATENT DOCUMENTS

| 2,003,271 A | 5/1935 | Beimann et al. |
| 2,206,440 A | 7/1940 | Walker |

(Continued)

FOREIGN PATENT DOCUMENTS

| DE | 1 226 077 B | 10/1966 |
| EP | 0 130 745 A2 | 1/1985 |

(Continued)

OTHER PUBLICATIONS

Office Action dated Jul. 16, 2015 in co-pending U.S. Appl. No. 14/162,445.

(Continued)

*Primary Examiner* — Charles Bushey
(74) *Attorney, Agent, or Firm* — Oblon, McClelland, Maier & Neustadt, L.L.P.

(57) ABSTRACT

The gas separation device separates or captures a target gas component from a gas to be processed by: causing an absorbing liquid to flow down on a surface of a packing disposed inside a processing tank while supplying the gas to be processed containing the target gas component into the processing tank; bringing the absorbing liquid flowing down on the surface of the packing and the gas to be processed into gas-liquid contact; and thereby causing the absorbing liquid to absorb the target gas component contained in the gas to be processed. The packing includes at least one packing unit formed from multiple expanded metal plates, which are disposed vertically and arranged in parallel. Each expanded metal plate includes strands forming the openings which are arranged like stairs. Each strand is inclined to the vertical direction at an angle in a range from 48° to 73°.

13 Claims, 10 Drawing Sheets

Related U.S. Application Data continuation of application No. PCT/JP2012/069183, filed on Jul. 27, 2012.

(51) Int. Cl.
*B01D 53/14* (2006.01)
*B01J 19/32* (2006.01)

(52) U.S. Cl.
CPC .............. *B01D 53/62* (2013.01); *B01J 19/32* (2013.01); *B01D 2252/103* (2013.01); *B01D 2252/204* (2013.01); *B01D 2252/20405* (2013.01); *B01D 2252/20421* (2013.01); *B01D 2252/20484* (2013.01); *B01D 2257/504* (2013.01); *B01D 2258/0283* (2013.01); *B01J 2219/322* (2013.01); *Y02C 10/04* (2013.01); *Y02C 10/06* (2013.01)

(58) Field of Classification Search
CPC ........... B01D 2252/20405; B01D 2252/20421; B01D 2252/20484; B01D 2257/504; B01D 2258/0283; B01D 2252/204; B01J 19/32; B01J 2219/322; Y02C 10/06; Y02C 10/04
USPC .............................. 261/112.1, 112.2, DIG. 72
See application file for complete search history.

(56) References Cited

U.S. PATENT DOCUMENTS

| | | | |
|---|---|---|---|
| 3,010,706 A | 11/1961 | McWilliams | |
| 3,346,246 A | 10/1967 | Loetel et al. | |
| 3,615,199 A * | 10/1971 | Terrana | B01D 47/06 261/114.1 |
| 3,687,818 A | 8/1972 | Porter et al. | |
| 3,782,703 A | 1/1974 | Kolar | |
| 4,105,724 A | 8/1978 | Talbot | |
| 4,208,284 A * | 6/1980 | Pretorius | B01D 11/0242 210/198.2 |
| 4,297,154 A * | 10/1981 | Keller | B21D 31/043 156/197 |
| 4,304,738 A | 12/1981 | Nutter | |
| 4,501,707 A | 2/1985 | Bühlmann | |
| 4,562,015 A | 12/1985 | Lefevre | |
| 4,708,856 A * | 11/1987 | Rukovena, Jr. | B01D 53/501 423/243.09 |
| 4,762,650 A | 8/1988 | Bosman | |
| 4,950,430 A | 8/1990 | Chen et al. | |
| 5,435,977 A * | 7/1995 | Chao | B01D 53/1425 422/171 |
| 5,460,755 A * | 10/1995 | Bosman | B01J 19/32 261/100 |
| 5,536,454 A | 7/1996 | Fujii et al. | |
| 6,511,051 B2 | 1/2003 | Kessler | |
| 6,715,740 B2 | 4/2004 | Engh et al. | |
| 8,827,248 B2 | 9/2014 | Short | |
| 2006/0185516 A1* | 8/2006 | Moriyama | B01D 53/62 96/234 |
| 2009/0151915 A1 | 6/2009 | Short | |
| 2009/0211447 A1* | 8/2009 | Lichtfers | B01D 53/1425 95/201 |
| 2014/0131902 A1 | 5/2014 | Huang et al. | |

FOREIGN PATENT DOCUMENTS

| | | |
|---|---|---|
| FR | 869.527 | 2/1942 |
| JP | 55-139822 A | 1/1980 |
| JP | 55-111598 U | 8/1980 |
| JP | 58-011001 A | 1/1983 |
| JP | 63-151331 A | 6/1988 |
| JP | 06-210121 A | 8/1994 |
| JP | 06-269628 A | 9/1994 |
| JP | 07-100324 A | 4/1995 |
| JP | 07-121357 B2 | 12/1995 |
| JP | 5704238 B2 | 4/2015 |

OTHER PUBLICATIONS

International Search Report dated Apr. 16, 2013 for PCT/JP2013/051588 filed Jan. 25, 2013 with English Translation.
International Written Opinion dated Apr. 16, 2013 for PCT/JP2013/051588 filed Jan. 25, 2013.
Extended European Search Report dated Apr. 22, 2015 in Patent Application No. 12817565.0.
Extended European Search Report dated Mar. 3, 2016 in Patent Application No. 13822200.5.
Office Action dated Oct. 27, 2015 in Japanese Patent Application No. 2014-526781 (with English language translation).

* cited by examiner

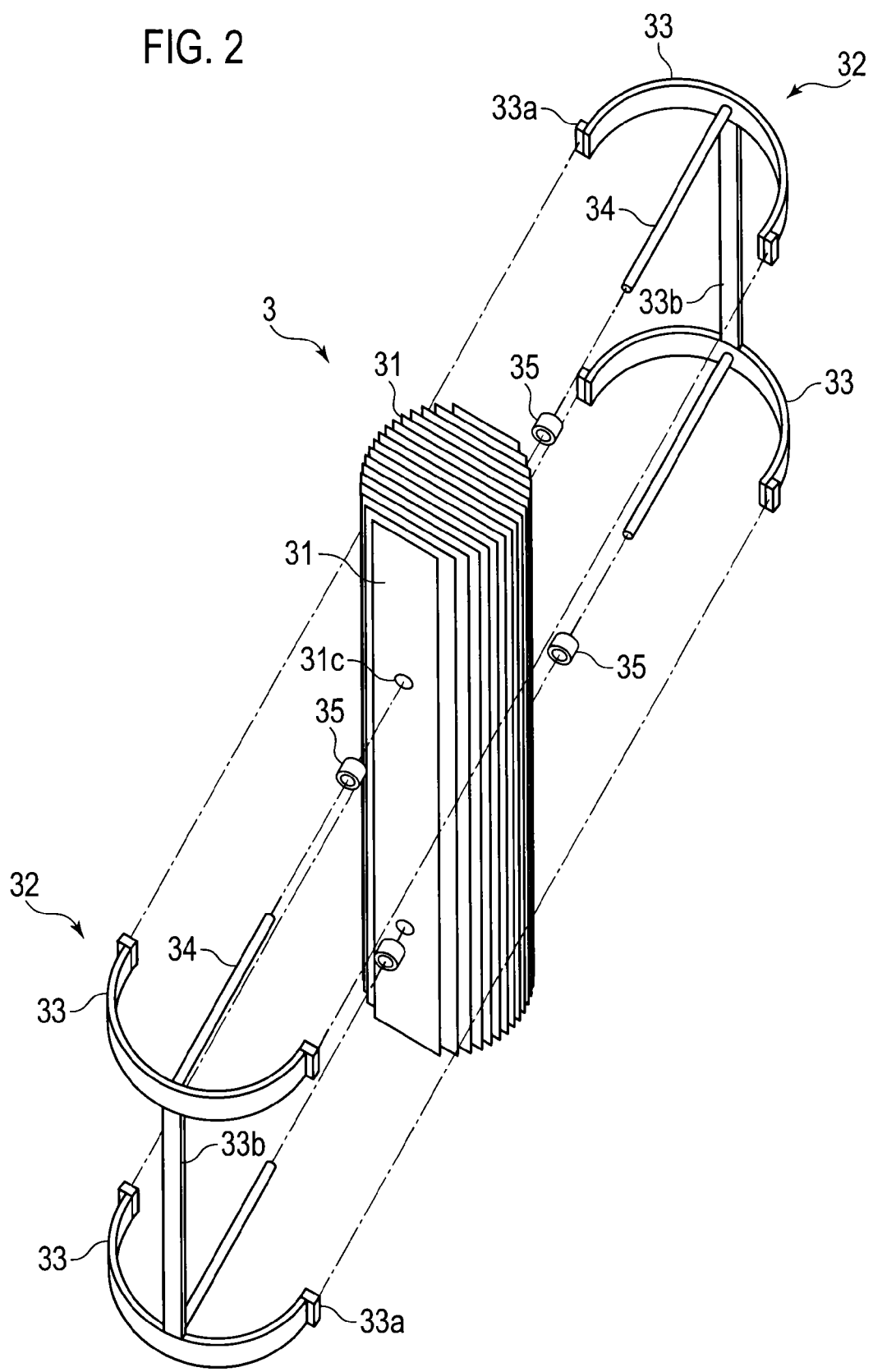

FIG. 9A
FIG. 9B
FIG. 9C
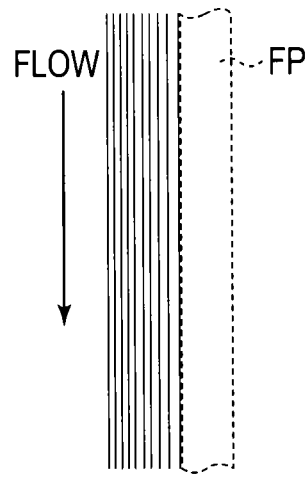
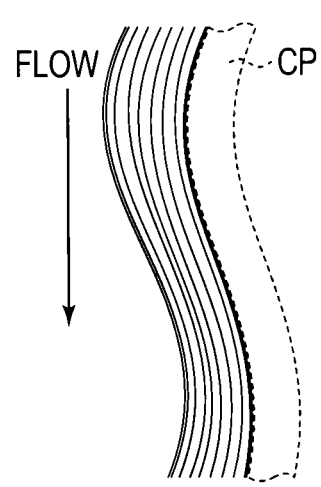
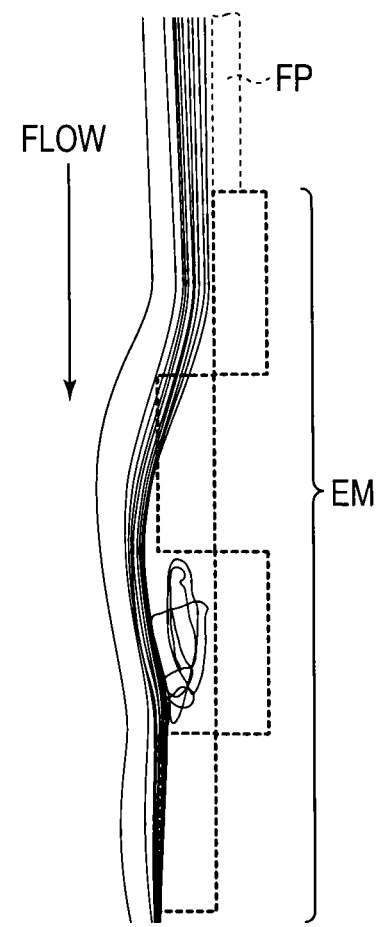

GAS SEPARATION DEVICE AND PACKING

CROSS REFERENCE TO RELATED APPLICATIONS

This application is a continuation application of International Application No. PCT/JP2013/051588, filed on Jan. 25, 2013, which claims priority to International Application No. PCT/JP2012/069183 filed on Jul. 27, 2012, the entire contents of which are incorporated by references herein.

BACKGROUND OF THE INVENTION

1. Field of the Invention

The present invention relates to a gas separation device configured to separate a specific target gas component contained in a gas to be processed by causing an absorbing liquid to absorb the gas component, and to a packing used in the gas separation device. In particular, the present invention relates to a gas separation device useful for a carbon dioxide capturing device, a gas cleanup device for removing a hazardous gas, and a separation device for separating a specific gas component from a mixed gas, which is configured to separate or capture a target gas component, such as carbon dioxide contained in a gas to be processed such as an exhaust gas, from the gas to be processed by bringing the gas to be processed and an absorbing liquid into gas-liquid contact, and causing the absorbing liquid to absorb the target gas component, and also relates to a packing used therein.

2. Description of the Related Art

Gas separation devices to separate, remove, or capture a specific gas from a gas to be processed, such as an exhaust gas containing various types of gases, by using gas-liquid contact have heretofore been used in chemical plants, thermal power plants, and the like. For example, a carbon dioxide capturing device separates carbon dioxide by bringing an absorbing liquid, such as a monoethanol amine aqueous solution, and a carbon dioxide-containing gas into gas-liquid contact to cause the absorbing liquid to absorb the carbon dioxide, then brings the absorbing liquid after the absorption into gas-liquid contact while heating the absorbing liquid to release the carbon dioxide to a gas phase, and captures the carbon dioxide therefrom. Meanwhile, in a gas cleanup device for removing a hazardous gas component from an exhaust gas and a gas separation device for separating a specific gas component from a mixed gas, as well, absorption of a specific gas component by an absorbing liquid takes place by using gas-liquid contact. Such a device configured to conduct the gas-liquid contact includes a packing for increasing a contact area between the absorbing liquid and the gas. The device brings the absorbing liquid and the gas into the gas-liquid contact on a surface of the packing, and causes the absorbing liquid to absorb the specific gas component from the gas.

However, the absorbing liquid sometimes fails to flow evenly on the surface of the packing due to an influence of the surface tension. In this case, a liquid film of the absorbing liquid flowing on the surface of the packing converges and the contact area between the absorbing liquid and the gas decreases. The decrease in the gas-liquid contact area results in shorter detention time of the absorbing liquid on the surface of the packing even when a flow rate of the supplied absorbing liquid remains unchanged. This is because a flow velocity of the absorbing liquid increases due to the convergence of the absorbing liquid on the packing. As a consequence, there has been a problem of a reduction in the amount of absorption by way of the contact between the absorbing liquid and the gas.

In this regard, in a gas-liquid contact device described in Japanese Patent Application Laid-Open Publication No. 06-210121 (PTL 1), any one of a rough surface portion with center line average roughness equal to or above 50 μm, a porous surface portion provided with multiple drilled holes, and a mesh-like object is employed to form a gas-liquid contact surface of a packing in order to increase its gas-liquid contact area.

Meanwhile, in a gas-liquid contact device described in Japanese Patent Application Laid-Open Publication No. 06-269628 (PTL 2), a gas-liquid contact surface is formed from a material prepared by attaching a mesh-like body to a surface of a plate-like body in order to increase its gas-liquid contact area.

In the meantime, in a gas-liquid contact device described in Japanese Examined Patent Application Publication No. 07-121357 (PTL 3), a gas-liquid contact portion is formed from a gas-liquid contact unit in which three-dimensional knitted fabrics made of fibers are arranged in numerous rows along a vertical or substantially vertical direction.

Meanwhile, in a gas-liquid contact device described in Japanese Patent Application Laid-Open Publication No. 07-100324 (PTL 4), mesh-like bodies each having a sufficiently large size for covering a transverse section of a gas-liquid contact region are arranged and fixed at intervals in a traveling direction of a mixed gas. This document also states that each mesh-like body may be formed from an expanded metal plate. This literature describes that part of an injection liquid collides with surfaces of linear portions constituting a mesh of the mesh-like body and is thus splattered, whereas the rest of the injection liquid comes into contact with the mixed gas to generate an aerosol, while flowing down on side surfaces of the linear portions in such a way as to cover the side surfaces in the form of thin films.

SUMMARY OF THE INVENTION

However, the techniques described in PTL 1 to PTL 3 have a problem of a significant increase in cost attributed to a burdensome task to process the packing. Particularly, a mesh-like body such as a metal mesh and a three-dimensional knitted fabric is soft in structure and has a problem of an increase in weight of the packing as a whole, because the mesh-like body is hardly able to stand alone or is prone to distortions of its shape when undergoing a process in an upright state, and therefore requires a support member such as a plate-like body. Such an increase in the weight of the packing also leads to increases in the weight and size of a structure for supporting the packing.

In the technique described in PTL 3 or PTL 4, a flowing direction of the gas is made horizontal inside the packing, and the layers of the packing are stacked in a direction substantially perpendicular to the flowing direction of the gas. Accordingly, this technique has a problem that the packing blocks the flow of the gas and increases a pressure loss, thereby deteriorating energy efficiency.

The present invention has been made in view of the above-mentioned problems. An object of the invention is to provide a gas separation device and a packing used therein, which are capable of realizing favorable gas-liquid contact and absorption while suppressing an increase in pressure loss during the gas-liquid contact, achieving a reduction in weight while suppressing distortions when undergoing a process in an upright state, and thereby reducing a manufacturing cost and an operation cost.

One aspect of the present invention provides a gas separation device configured to separate or capture a target gas component from a gas to be processed by: causing an absorbing liquid to flow down on a surface of a packing disposed inside a processing tank while supplying the gas to be processed containing the target gas component into the processing tank; bringing the absorbing liquid flowing down on the surface of the packing and the gas to be processed into gas-liquid contact; and thereby causing the absorbing liquid to absorb the target gas component contained in the gas to be processed. The packing includes at least one packing unit formed from multiple expanded metal plates, which are disposed vertically and arranged in parallel.

Meanwhile, another aspect of the present invention provides a packing to be used in a gas processing device for causing an absorbing liquid to absorb a target gas component contained in a gas to be processed, where the packing is used in such a way as to cause the absorbing liquid to flow down on a surface of the packing in order to bring the absorbing liquid and the gas to be processed into sufficient contact. Here, the packing includes at least one packing unit provided with multiple expanded metal plates which are arranged in parallel and upright in the vertical directions.

The packing unit may include: a holding member configured to hold the multiple expanded metal plates into a state of being arranged in parallel; spacers configured to provide regular intervals between the multiple expanded metal plates; and an annular member configured to encircle the outer periphery of the multiple expanded metal plates and to integrally fix the multiple expanded metal plates. A penetrating member configured to penetrate through the multiple expanded metal plates may be used as the holding member. The multiple expanded metal plates may be provided with through-holes to allow penetration of the penetrating member; and erected portions may be each formed by bending part of the strands constituting the multiple expanded metal plates at an edge of the through-hole in such a way as to be erected in a plate thickness direction, and be used as the spacers.

The multiple expanded metal plates may be formed from strands each inclined at an angle $\theta$ ($0°<\theta\leq 90°$) to the vertical direction. Here, one having the angle $\theta$ in a range from 48° to 73° is preferably used.

The gas separation device is applicable to an absorption tower of a carbon dioxide capturing device where carbon dioxide is the target gas component and an aqueous solution of an amine compound, for example, is the absorbing liquid.

According to the above-described gas separation device of the present invention, the expanded metal plates are used in the packing. Thus, it is possible to construct the plate-like packing having certain strength while including the numerous openings. Even when the expanded metal plates alone undergo a process in an upright state, distortions of the expanded metal plates can be suppressed. Accordingly, it is not necessary to use a member for supporting the packing, which is the body that stands alone. Thus, reductions in weight, size, and cost of the packing can be achieved. In addition, the gas separation device with high absorption efficiency is provided at a low manufacturing cost because it is easy to process and assemble the expanded metal plates.

Moreover, mass transfer and matter exchange in the liquid film can be promoted. Thus, it is possible not only to improve absorption efficiency of the absorbing liquid, but also to reduce an amount of the absorbing liquid which does not contribute to the absorption of the target gas component, thereby reducing a processing cost. Furthermore, a sufficient gas-liquid contact area and contact time can be secured, so that the absorption efficiency can be improved without increasing the size of the device.

Meanwhile, since distortions of the packing formed from the thin plates can be prevented when the packing undergoes the process in the upright state, a passage for the gas can always be secured while preventing the passage for the gas from being blocked by a deformation of the packing. Thus, it is possible to suppress an increase in pressure loss during gas circulation, and thereby to suppress deterioration of energy efficiency.

As a consequence, it is possible to provide a gas separation device with high energy efficiency, to achieve a reduction in the weight of the device, and to reduce a manufacturing cost and a processing cost thereof.

BRIEF DESCRIPTION OF THE DRAWINGS

FIGS. 1A and 1B depict a gas separation device according to an embodiment of the present invention, in which FIG. 1A is an overall configuration diagram and FIG. 1B illustrates partially enlarged views of a packing.

FIG. 2 is an exploded perspective view of the packing shown in FIG. 1A.

FIGS. 3A-3C depict explanatory views of the packing shown in FIG. 1A, in which FIG. 3A is a horizontal sectional view, FIG. 3B is a vertical sectional view, and FIG. 3C shows a modified example of a spacer.

FIGS. 9A-9C depict results of a CFD analysis on flow line distribution of a liquid flowing down on packings, in which FIG. 9A shows the result in a case where the packing has a flat surface, FIG. 9B shows the result in a case where the packing is a corrugated plate, and FIG. 9C shows the result in a case where the packing is the expanded metal plate according to the embodiment of the present invention.

DESCRIPTION OF THE PREFERRED EMBODIMENTS

Figure 1A:
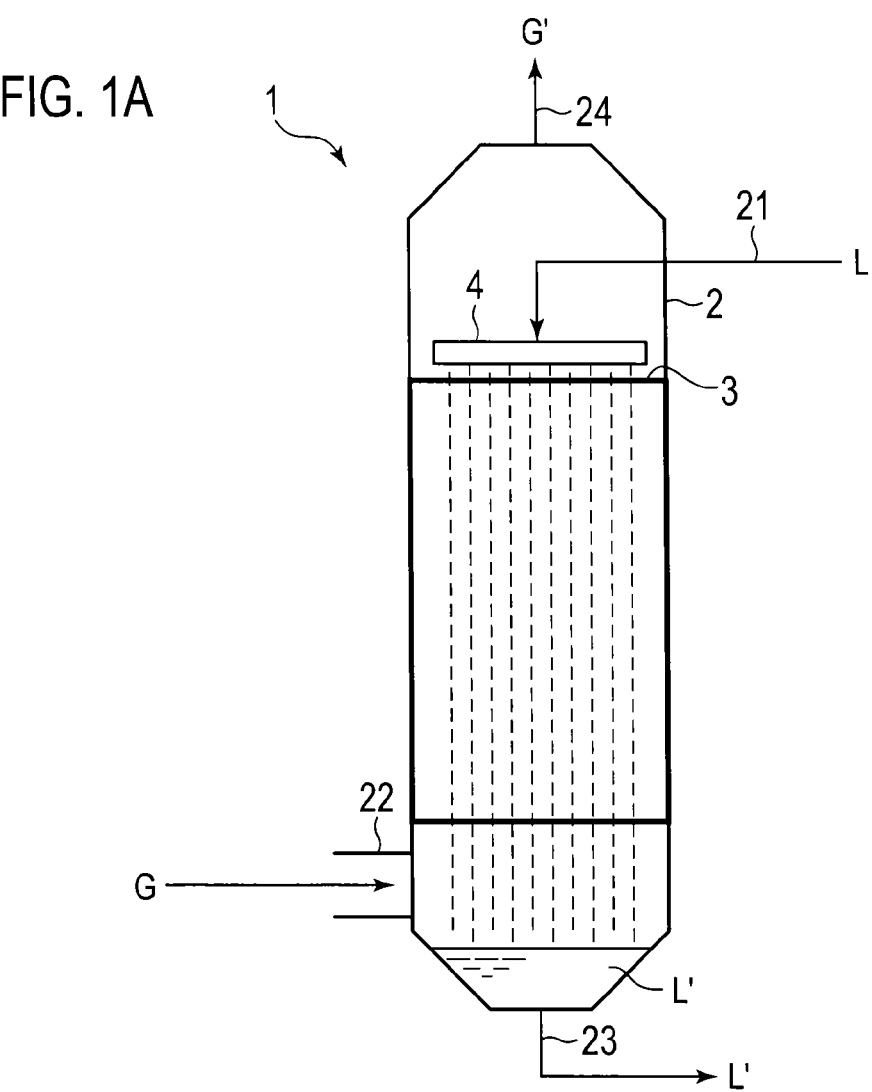
Figure 1B:
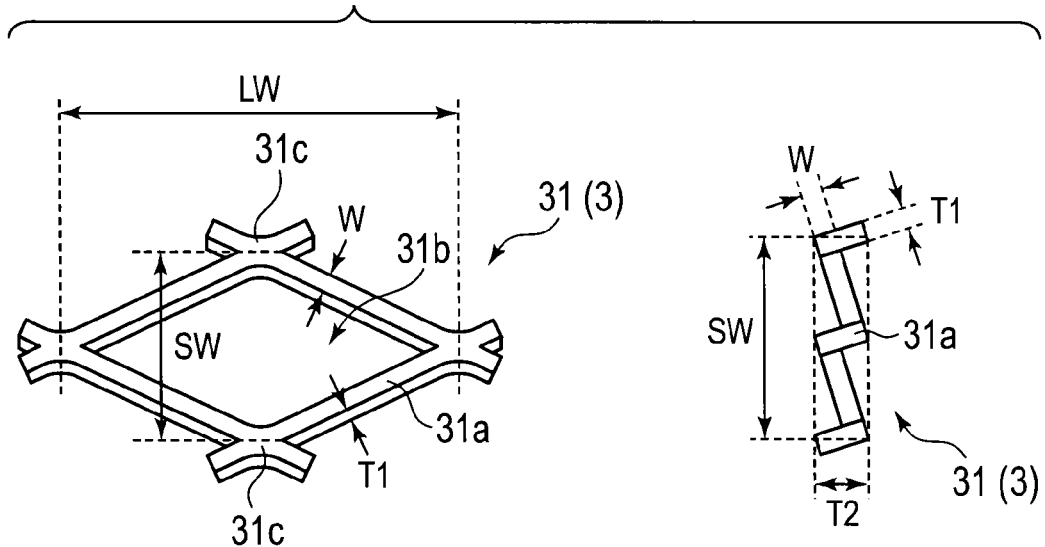
Figure 3A:
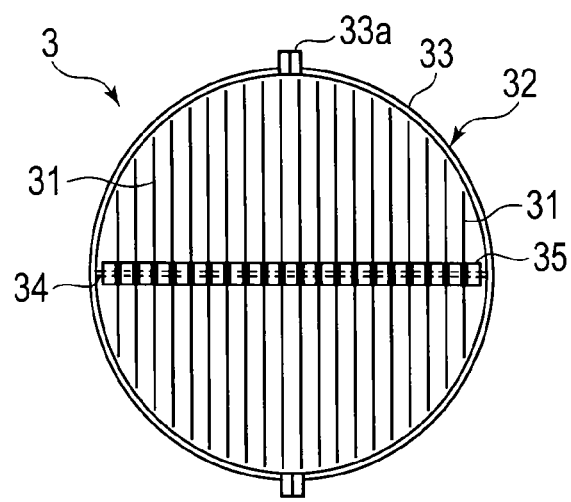
Figure 3B:
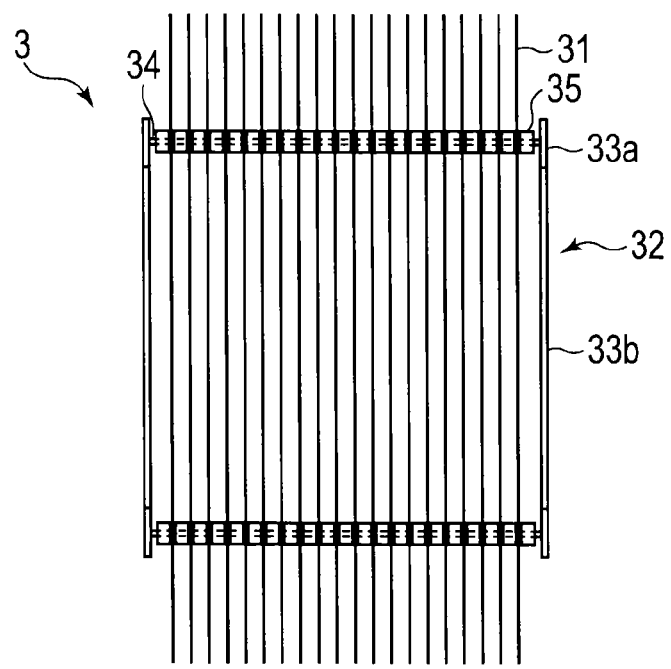
Figure 3C:
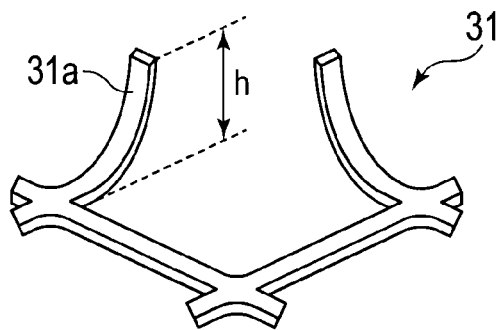

An embodiment of the present invention will be described below by using FIG. 1A to FIG. 5. FIGS. 1A and 1B depict a gas separation device according to the embodiment of the present invention, in which FIG. 1A shows an overall configuration diagram and FIG. 1B shows a partially enlarged view of a packing. FIG. 2 is an exploded perspective view of the packing shown in FIG. 1A. FIGS. 3A-3C depict explanatory views of the packing shown in FIG. 1A, in which FIG. 3A shows a horizontal sectional view, FIG. 3B shows a vertical sectional view, and FIG. 3C shows a modified example of a spacer. It is to be noted that the embodiment is configured as the gas separation device in the case of being used as an absorption tower of a carbon dioxide capturing device, in which carbon dioxide contained in an exhaust gas is absorbed by an absorbing liquid through gas-liquid contact between the exhaust gas and the absorbing liquid.

As shown in FIGS. 1A and 1B, a gas separation device 1 of the embodiment causes an absorbing liquid L to flow down on a surface of a packing 3 disposed inside a processing tank 2, supplies a gas G to be processed (an unprocessed gas) containing a target gas component into the processing tank 2, brings a liquid film of the absorbing liquid L formed on the surface of the packing 3 and the gas G to be processed into gas-liquid contact, thereby causing the absorbing liquid L to absorb the target gas component and thus separating or capturing the target gas component from the gas G to be processed. At least one packing unit, which includes multiple expanded metal plates 31 that are disposed vertically and arranged in parallel, is used as the packing 3. Although one packing unit is used in the embodiment, multiple packing units arranged in parallel or stacked vertically may be used depending on the design of the device structure. When the packing units are stacked vertically, the packing units are preferably laid out such that a direction of the parallel arrangement of the expanded metal plates 31 of the upper unit intersects with a direction of the parallel arrangement of the expanded metal plates 31 of the lower unit.

The processing tank 2 has a substantially cylindrical shape and forms an outer shell of the gas separation device 1. An absorbing liquid supply line 21 as a supply unit to supply the absorbing liquid L into the gas separation device 1 is connected to an upper part of the processing tank 2. The absorbing liquid L may be refined (regenerated) in a facility such as a chemical plant and a thermal power plant, and then either supplied directly to the absorbing liquid supply line 21 or supplied from a storage tank, which is configured to temporarily store the refined absorbing liquid L, to the absorbing liquid supply line 21. In the meantime, the absorbing liquid supply line 21 is connected to a spray pipe 4 horizontally disposed above the packing 3. The spray pipe 4 is formed into such a shape that can distribute the absorbing liquid onto the packing 3 in any of a spiral shape, an annular shape, a parallel (meandering) shape, and a lattice shape. Numerous openings for discharging the absorbing liquid L are formed on a lower surface of the spray pipe 4. Note that the structure of the spray pipe 4 is not limited only to the illustrated one, and any of spray devices that have conventionally been used in general, such as shower heads, spray nozzles, and straw nozzles, can also be used as appropriate.

Moreover, a gas supply pipe 22 provided in order to introduce the gas G to be processed into the gas separation device 1 and to supply the gas G to the packing 3 is connected to a lower part of the processing tank 2. The gas G to be processed is a gas containing carbon dioxide, such as a post-combustion gas (an exhaust gas) generated in the facility such as the chemical plant and the thermal power plant and a reaction gas after being used for fuel gasification of coals. The gas G to be processed is supplied from the facility to the gas supply pipe 22. Here, the processing tank 2 is constructed as a countercurrent type in which the absorbing liquid L is caused to flow down from top in the processing tank 2 while the gas G to be processed is caused to flow up from bottom in the processing tank 2. However, the configuration of the processing tank 2 is not limited only to this one. For example, the processing tank 2 may be constructed as a co-current type in which the gas G to be processed is also sent down from top in the processing tank 2.

Meanwhile, a discharge line 23 for recovering a used absorbing liquid L' is connected to a bottom of the processing tank 2. The used absorbing liquid L' having passed through the packing 3 and come into contact with the gas G to be processed is temporarily stored at the bottom of the processing tank 2, and is then discharged to the outside through the exhaust line 23 and recovered as appropriate. The used absorbing liquid L' thus recovered can be regenerated and reused by means of a stripping tower (a regeneration tower) configured to cause the absorbing liquid L' to release carbon dioxide by application of heat using a heat source such as steam.

In the meantime, a gas discharge line 24 for discharging a processed gas G' from which the target gas component has been removed is connected to a ceiling of the processing tank 2. The processed gas G' having passed through the packing 3 and come into contact with the absorbing liquid L may be discharged to the atmosphere through a smokestack, or delivered to another processing facility prepared as appropriate and then subjected to other processing.

Here, a cooling device or the like configured to condense the absorbing liquid in a vapor state and thus to recover the absorbing liquid from the processed gas may also be disposed in the processing tank 2 when necessary.

The packing 3 is formed from expanded metal plates 31 each in a rhombic mesh shape as shown in FIG. 1B. In FIG. 1B, a left-hand drawing shows a perspective view of a mesh and a right-hand drawing shows a cross-sectional view of the mesh taken in a plate thickness direction. The expanded metal plate 31 is a plate member processed into a mesh-like form by: providing staggered cuts (slits) into a material plate made of a metal such as stainless steel, aluminum, nickel, titanium, and carbon steel; and then expanding the material plate. The mesh shape of the expanded metal plate includes not only the rhombic form but also a hexagonal form. However, the rhombic form is preferably used. The expanded metal plate 31 includes openings 31b which are formed from strands 31a and arranged like stairs. The mesh structure of the expanded metal plate 31 can be specified by an inter-center distance SW in a short diagonal direction of the mesh, an inter-center distance LW in a long diagonal direction of the mesh, a thickness T1, a thickness T2, and a step width W. Here, the thickness T1 is the thickness of the material plate of the expanded metal plate, and is equal to a thickness of the strand 31a or a bond 31c that is an intersecting point of neighboring strands 31a. Meanwhile, the thickness T2 is a thickness of the expanded metal plate 31 as a whole (an overall thickness), or in other words, a height of the expanded metal plate 31 from a plane when the plate is laid on the plane. As shown in the right-hand drawing in FIG. 1B, regions of the expanded metal plate 31 protruding outermost from two sides thereof are a pair of corner portions (edge portions) located on opposing corners of each bond 31c. As a consequence, the thickness T2 is equal to a length of a diagonal line of a cross section of the bond 31c. Formation of the metal plate member into the plate member having the above-described mesh structure makes it possible to provide numerous openings 31b for saving the weight while maintaining certain strength, and to form asperities on the surface. Accordingly, even when the expanded metal plate 31 alone undergoes a process in an upright state, it is possible to suppress distortions of the shape thereof. Moreover, it is not necessary to use a member for supporting the packing 3 which is the body that stands alone. Thus, reductions in weight and size of the packing 3 can be achieved. In addition, it is possible to reduce a manufacturing cost for the packing 3 since the expanded metal plates can be processed easily. As for the material of the expanded metal plate 31, any metal which does not react (corrode) with the absorbing liquid may be selected and used as appropriate. In addition to the metal materials mentioned above as the examples, the expanded metal plate 31 may be manufactured by using brass, copper, Monel metal, silver, tin, niobium, and the like. Any of these materials may also be selected depending on the situation. Meanwhile, resin plate members having a mesh structure similar to that of the expanded metal plate are manufactured by using ductile resins such as polyethylene, polypropylene, and PTFE, and are offered commercially. Any of such resin mesh-like plate members may also be used as the expanded metal plate 31. When the resin mesh-like plate member is used, material characteristics of the resin allow extension of the range of application to gas-liquid contact and gas separation processing by using an acidic absorbing liquid that would cause corrosion of metals.

The width (step width) W of the strands 31a and the size of the openings 31b (the inter-center distance SW in the short diagonal direction of the mesh and the inter-center distance LW in the long diagonal direction of the mesh) can be arbitrarily adjusted at the time of manufacturing the expanded metal plate by adjusting the slit width and the expanding strength. Meanwhile, the thickness T1 of the material plate may be arbitrarily set at the time of selecting the material plate. Moreover, a suitable expanded metal plate is appropriately selected and used such that the expanded metal plate 31 has the sufficient size (mesh dimensions) of the openings as well as the sufficient thickness T1 to allow the absorbing liquid L flowing down on the expanded metal plate 31 to form a sufficient amount of a liquid film on its surface. A sufficient gas-liquid contact area can be secured by causing the absorbing liquid L to thinly spread and form a thin liquid film on the surface of the expanded metal plate 31.

Wetting spread of the absorbing liquid L flowing down on the expanded metal plate 31 varies with the mesh shape, and a wet area on which the liquid film is formed on the expanded metal plate 31 varies with an angle θ of inclination of each strand 31a of the expanded metal plate to the vertical direction (an angle defined between the vertical direction and the strand 31a, $0°<θ≤90°$). The wetting spread is favorable in the case of the mesh shape with the angle θ in a range from 48° to 73°. It is desirable to use one with the angle θ in a range from 50° to 70°. Accordingly, it is preferable to use the expanded metal plate while aligning the short diagonal direction of the mesh with the vertical direction. In this respect, the rhombic-mesh expanded metal plate has an advantage over a general metal mesh or the like in which wires perpendicularly cross one another in a matrix. From the viewpoint of formation of the liquid film with high gas-liquid contact efficiency, the inter-center distance SW in the short diagonal direction of the mesh is set preferably in a range from about 0.6 to 8.5 mm, or more preferably in a range from about 1.8 to 3.0 mm. The inter-center distance LW in the long diagonal direction of the mesh is set preferably in a range from about 1.0 to 11 mm, or more preferably in a range from about 3.0 to 6.0 mm. From the viewpoint of the strength and the like, the thickness T1 is set preferably in a range from about 0.2 to 0.3 mm. The thickness T1 has an influence on the wet area but the degree of the influence is not so large. Accordingly, it is possible to form the preferred liquid film with the thickness in the aforementioned ranges.

In the meantime, an investigation on flow line distribution of a liquid flowing down on the expanded metal plate by means of CFD (computational fluid dynamics) analyses found that the asperities on the expanded metal plate 31 have an effect to promote mass transfer and matter exchange in the liquid film. To be more precise, the flow line distribution is investigated in terms of a perpendicular cross section in the thickness direction of the liquid film formed when the liquid flows down on a vertical plate member. Here, the flow line distribution is almost uniform when the liquid flows down on a flat plate or a plate with a corrugated surface. On the other hand, when the liquid flows down on the expanded metal plate, a vortex occurs in the flow line distribution in the liquid film at a recess due to turbulence of the liquid that flows from a projection to the recess. This develops agitation and mixing of the liquid, thereby promoting dispersion and homogenization of components contained in the liquid. Thus, it is possible to improve the efficiency of the contact between the absorbing liquid L and the gas G to be processed, and to reduce a proportion of the absorbing liquid L which does not contribute to the absorption of the target gas component due to stagnation away from the surface of the liquid film. As a consequence, a processing cost can be reduced. Furthermore, when compared with the expanded metal plate, the metal mesh is likely to cause the liquid to stagnate in a gap at a portion where a longitudinal line and a lateral line come into contact and intersect with each other by capillary action, and is likely to allow only a surface portion of the liquid film to flow down. On the other hand, the expanded metal plate provided with the continuous strands does not have any gaps for allowing stagnation of the liquid. Here, the liquid repeats convergence and bifurcation during its flow on the surfaces of the inclined strands, and is evenly mixed as a consequence. Moreover, the downward flow of the liquid along the inclined strands always involves a lateral flow of the liquid. This is the structure that can easily maintain the wetting spread even under the condition where the liquid is apt to cause convergence due to an influence of its surface tension. The expanded metal plate is therefore more advantageous. Accordingly, the packing 3 using the expanded metal plate 31 can secure a sufficient gas-liquid contact area and sufficient contact time on the surface, and improve the absorption efficiency without increasing the size of the device.

The packing unit used as the packing 3 can be constructed as shown in FIG. 2, for example (note that each expanded metal plate is simply illustrated as a plate shape while omitting the meshes therein). Specifically, the packing unit includes a fixation member 32 to integrate the multiple expanded metal plates 31. The fixation member 32 includes: annular portions 33 designed to encircle the outer periphery of the expanded metal plates 31 and thereby to integrally fix the expanded metal plates 31; penetrating portions 34 designed to penetrate through the multiple expanded metal plates 31; and spacers 35 respectively disposed in spaces between the multiple expanded metal plates 31 to maintain the intervals of the plates. By using the above-described fixation member 32, it is possible to integrate the multiple thin expanded metal plates 31 together and to maintain their upright body, thereby facilitating handling at the time of transportation and installation. In FIG. 2, the expanded metal plates having the shapes respectively corresponding to multiple cross sections obtained by cutting a columnar shape, which fits to a loading space inside the processing tank 2, in parallel with an axial direction at regular intervals are integrated into the packing 3 so as to form the overall shape into the substantially columnar shape, thereby allowing the packing 3 to be loaded into the columnar processing tank 2 while establishing its close contact therewith. Instead, a packing unit may be formed as a block having a shape of a substantially half column or a substantially quadrant column, and then two or four blocks may be combined into the substantially columnar shape.

The overall shape of the packing unit may be appropriately changed depending on the shape of the processing tank 2. If the processing tank 2 has a shape of an elliptical column, a quadrangular prism, or any other polygonal prisms, for example, then the overall shape of the packing unit may be modified into any of the elliptical column, the quadrangular prism, and other polygonal prisms corresponding to the shape of the processing tank 2 so that the packing unit can be loaded as the packing 3 into the processing tank 2 while establishing its close contact therewith. The positioning and the fixation of the loaded packing unit can be achieved, for example, by providing projections for locking a lower edge portion of the packing unit to an inner peripheral wall of the processing tank 2, or by providing a mesh platform inside the processing tank 2 for placing the packing unit. Alternatively, the packing unit may be suspended in the processing tank 2.

Accordingly, when the processing tank 2 is in the cylindrical shape, lateral widths of the respective expanded metal plates 31 are set in consideration of the plate intervals and the plate thickness such that the combined expanded metal plates 31 form the columnar external shape which can be contained in the processing tank 2. On the other hand, when the expanded metal plates 31 are divided into pieces in the plate width direction so as to be formed into the blocks each having the shape of the substantially half column or the substantially quadrant column, the lateral widths of the respective expanded metal plates 31 are set such that the combined expanded metal plates 31 form the columnar external shape, as a whole, which can be contained in the processing tank 2. Here, when the processing tank 2 is in a quadrangular prism shape, the packing 3 is constructed using the packing unit formed by combining the multiple expanded metal plates 31 having a constant plate width corresponding to the quadrangular prism into that shape.

As shown in FIG. 3A, for example, the annular portion 33 is configured to be able to fix the outer periphery of the multiple expanded metal plates 31 by joining a pair of semicircular portions into which the ring is bisected and then fastening flange portions 33a to one another by using fasteners such as bolts (in the drawing, each expanded metal plate is simply illustrated as a plate shape while omitting the asperities thereon). Although this example shows the case where the annular portion 33 forms the circular shape when assembled, the annular portion 33 may be modified to form a polygonal shape that corresponds to the internal shape of the processing tank 2 when assembled. Instead, the annular portion 33 may be divided into three or more pieces. In any case, the annular portion 33 need not be divided into equal parts.

In the meantime, as shown in FIG. 2, two annular portions 33 may be provided in an upper part and a lower part, respectively, and may be provided with connection portions 33b which connect the upper annular portion 33 and the lower annular portion 33 to each other. This configuration makes it possible to support the expanded metal plates 31 in multiple locations and thereby to maintain the integrated shape. Meanwhile, three or more annular portions 33, for example, may be disposed, and the connecting portions 33b may be omitted.

Each penetrating portion 34 is inserted into through-holes 31c formed in the expanded metal plates 31. Here, the penetrating portions 34 may be formed from a pair of shafts respectively provided to the pair of semicircular portions, for example. Here, one of the shafts is formed into a hollow shape while the other shaft is formed into such a shape as to be insertable into the hollow of the one shaft. This configuration enables the other shaft of the penetrating portion 34 to be inserted into the one shaft of the other penetration portion 34 when the semicircular portions are combined together. Thus, it is possible to obtain the strength necessary for supporting and fixing the expanded metal plates 31. Naturally, the penetrating portion 34 may be formed of one shaft as long as the shaft can provide the sufficient strength. In that case, the shaft on one of the semicircular portions may be inserted into the through-holes 31, and then inserted into and supported by the other semicircular portion.

As shown in FIG. 2, the multiple expanded metal plates 31 constituting the packing 3 are vertically disposed at regular intervals and integrated together. Here, as shown in FIGS. 3A and 3B, the spacers 35 are inserted into the respective gaps between the expanded metal plates 31. The adjustment of the length in an axial direction of each spacer 35 makes it possible to arbitrarily set the intervals between the expanded metal plates 31, i.e., a cross-sectional area of a passage of the packing 3 where the process gas G passes through. FIG. 2 illustrates the spacers 35 each in the shape of a circular tube. However, the shape of each spacer 35 is not limited only to such a shape. Its shape may be any of polygonal tubes such as a triangular tube, a square tube, and a rhombic tube. Alternatively, its shape may be of an elliptical tube. Instead of the spacers 35 described above, the spacers 35 may be formed in the following manner. Specifically, as shown in FIG. 3C, the through-hole 31c is formed by cutting the strands at the location where to form each through-hole 31c in each expanded metal plate 31, and then by bending (folding or curving) and electing the cut-out ends in the plate thickness direction, and thus, the erected portions formed at the periphery of the through-hole 31c are concurrently formed to function as the spacer 35. With this configuration, it is not necessary to manufacture the spacers 35 as separate components. Moreover, it is possible to save the labor for inserting the spacers 35 alternately when the multiple expanded metal plates 31 are combined together, and thereby to reduce the manufacturing cost. In the meantime, the location where to form each erected portion is not limited to an edge of the corresponding through-hole 31c. Instead, the erected portions may be formed at upper and lower ends or at two side ends of each expanded metal plate 31 by bending portions of the strand ends. The adjustment of an erection height h of the strand ends of the expanded metal plates 31 defines the intervals between the expanded metal plates 31, and thus makes it possible to arbitrarily set the cross-sectional area of the passage of the packing 3 where the process gas G passes through. From the viewpoints of a reduction in pressure loss during the gas supply and of the contact efficiency, the intervals between the expanded metal plates 31 are preferably set in a range from about 5 to 15 mm. Accordingly, the length of each spacer 35 or the height h of each erected portion can be appropriately set on the basis of the above-mentioned range.

Meanwhile, the penetrating portions 34 (i.e., penetrating rods) that penetrate through the expanded metal plates 31 arranged in parallel function as holding members which hold the expanded metal plates 31 into the state of being arranged in parallel. Accordingly, the fixation members 32 without the annular portions 33 can also be used. In other words, the expanded metal plates 31 can be held into the state of being arranged in parallel while maintaining the plate intervals only by use of the penetrating rods and the spacers 35, and can therefore be installed in and fixed to the processing tank 2 in that state. Furthermore, if the bent portions formed by bending the cut-out ends of the strands at the locations where to provide the through-holes 31c as shown in FIG. 3C are used instead of the spacers 35, then it is possible to construct the packing unit while holding the multiple expanded metal plates 31 into the state of being arranged in parallel by using at least one penetrating rod only. In addition, when lock members serving as stoppers are provided to two ends of the penetrating rod that penetrates through the expanded metal plates 31, the resultant assembly can be handled like the packing unit of FIG. 2. The penetrating rod only needs to have such a thickness sufficient to retain the strength that can support the expanded metal plates 31. The penetrating rod is appropriately selected depending on the design of the packing unit. Generally, a metal rod having a thickness of about 5 to 10 mm is preferably used. The size of the through-holes 31 is appropriately set in accordance with the thickness of the used penetrating rod.

According to the above-described packing 3, the expanded metal plates are less likely to cause distortions when undergoing a process in an upright state, so that the passage for the gas G to be processed can be prevented from being blocked. As a consequence, it is possible to stably secure the passage for the gas G to be processed, to suppress an increase in pressure loss, and thereby to suppress deterioration of energy efficiency. Incidentally, the embodiment illustrates the case where the expanded metal plates 31 are arranged in one direction. In another example, however, two expanded metal plates can be assembled to intersect with each other by: forming a vertical incision at an upper half of one expanded metal plate; forming a vertical incision at a lower half of another expanded metal plate; and bringing the expanded metal plates into mesh such that the incisions break into each other. An application of this assembly method can achieve vertical arrangement of the expanded metal plates 31 in a lattice fashion. The above-mentioned fixation members 32 and the like are not necessary in this case.

Figure 4:
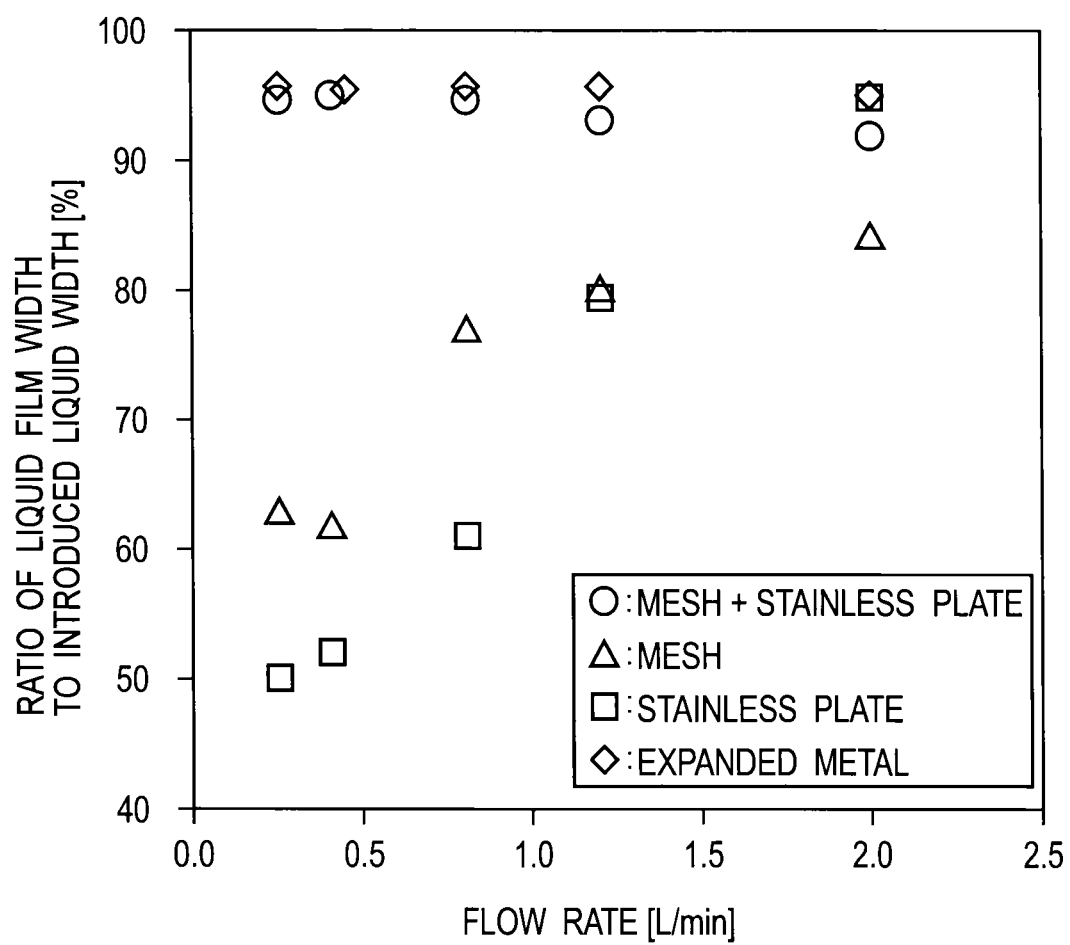
FIG. 4 is a graph showing a relation between a flow rate of a liquid flowing down in the packing and a ratio of a liquid film width to an introduced liquid width.

When a metal mesh is used as the packing, a flat plate is usually additionally attached to support the metal mesh. In this case, wettability of the packing is also improved by using the flat plate. In the case of the present invention where the expanded metal plates 31 are used as the packing 3, the packing 3 can exert the wettability that is equivalent to the case of attaching the flat plate to the metal mesh, since each expanded metal plate 31 has high wettability. This point is easily learned from a graph of FIG. 4. FIG. 4 is a graph showing a relation between a flow rate of a liquid (water), in the case where the liquid in a predetermined width is introduced to an upper end of the packing and caused to flow down thereon, and a ratio [%] of the width of a liquid film formed on the packing by the liquid flowing down thereon with respect to the introduced liquid width (to be further described in detail). According to FIG. 4, the width of the liquid film decreases in accordance with a reduction in the amount of the liquid that flows down when either a metal mesh or a flat plate (a stainless (SUS) plate) is used alone. In the meantime, the attachment of the flat plate to the metal mesh maintains the width of the liquid film even if the amount of the liquid decreases. On the other hand, when the expanded metal plate is used alone, the width of the liquid film is maintained even when if the amount of the liquid decreases, and the expanded metal plate exhibits the wettability equivalent to that in the case of attaching the flat plate to the metal mesh. Accordingly, it is not necessary to attach the flat plate for the purpose of improving the wettability. The use of the expanded metal plate is therefore extremely advantageous for achieving reductions in weight and size of the packing.

Figure 5:
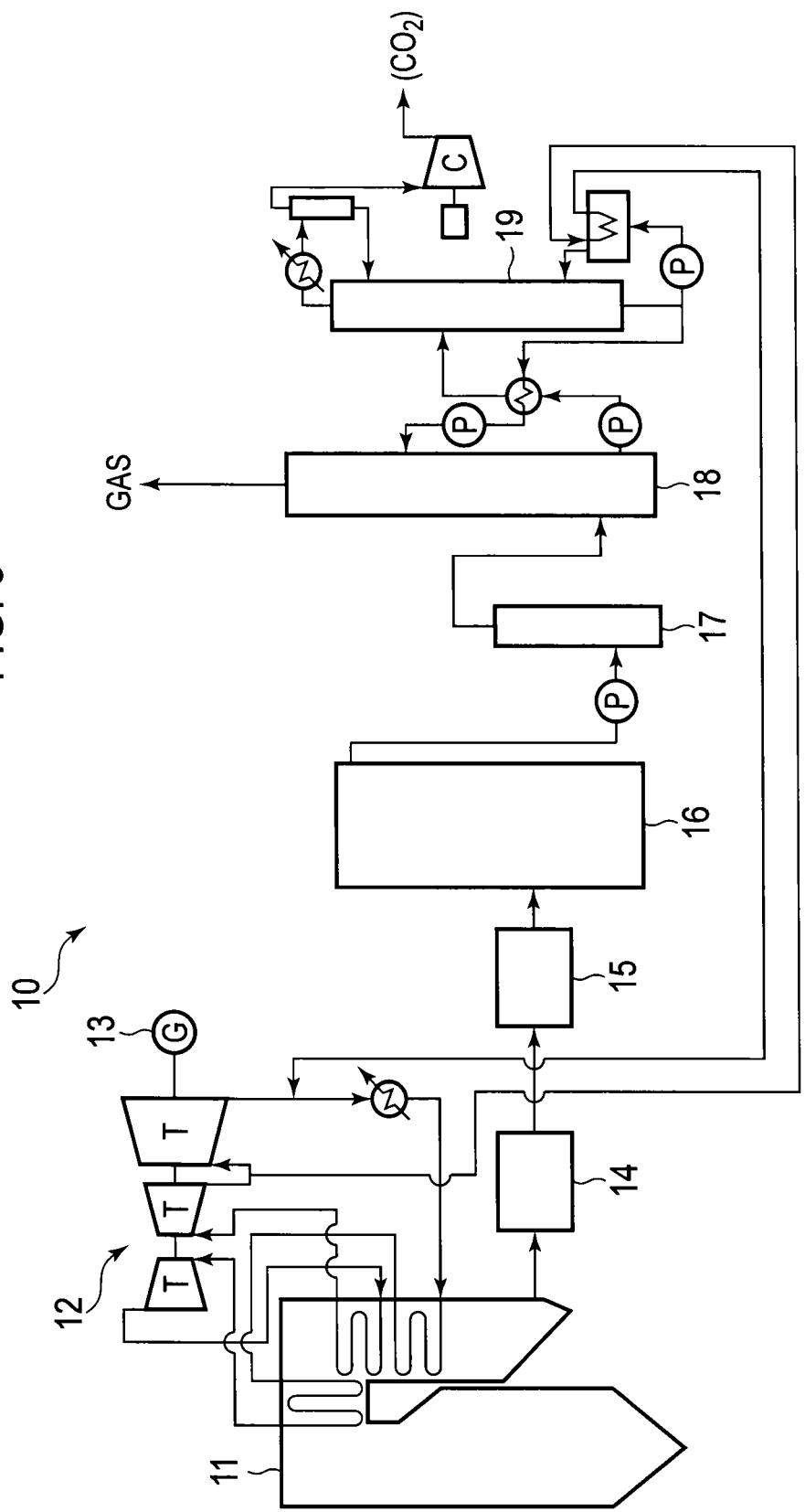
FIG. 5 is a schematic configuration diagram of a thermal power plant including a gas-liquid contact device according to the embodiment of the present invention.

A case of applying the gas separation device 1 according to the above-described embodiment to a thermal power plant 10 will be described with reference to FIG. 5. FIG. 5 is a schematic configuration diagram of the thermal power plant equipped with the gas separation device according to the embodiment of the present invention.

As shown in FIG. 5, the thermal power plant 10 includes: a boiler 11 configured to combust a fossil fuel such as coals and to transform the fuel into thermal energy; a turbine 12 configured to transform the thermal energy into kinetic energy; a generator 13 configured to transform the kinetic energy into electrical energy; an exhaust gas denitrator 14 configured to remove nitrogen oxides from an exhaust gas discharged from the boiler 11; an electrostatic precipitator 15 configured to remove dust from the exhaust gas; an exhaust gas desulfurizer 16 configured to remove sulfur oxides from the exhaust gas; a pre-processing tower 17 configured to remove the remaining sulfur oxides from the exhaust gas; an absorption tower 18 configured to remove carbon dioxide from the exhaust gas; and a stripping tower 19 configured to capture carbon dioxide from a liquid after being subjected to the absorption by the absorption tower 18.

The illustrated thermal power plant 10 employs a steam power generation method of generating electric power by: generating high-temperature and high-pressure steam with the boiler 11 by combusting a fossil fuel such as heavy oil, LNG (liquid natural gas), and coals; and rotating the generator 13 by driving the turbine 12 with the steam.

The exhaust gas discharged from the boiler 11 is sequentially transferred to the exhaust gas denitrator 14, the electrostatic precipitator 15, the exhaust gas desulfurizer 16, the pre-processing tower 17, and the absorption tower 18, and is processed until amounts of impurities and contaminants contained in the exhaust gas are reduced to predetermined standard values or below. The exhaust gas is eventually discharged to the atmosphere.

The exhaust gas denitrator 14 removes the nitrogen oxides in the exhaust gas by using, for example, a catalytic reduction method using ammonia, a non-catalytic reduction method, an activated carbon method, an electron beam irradiation method, an oxidation-reduction method, and the like. Meanwhile, the electrostatic precipitator 15 removes the dust in the exhaust gas by: generating corona discharge by using a direct current; electrically charging the dust in the exhaust gas; and causing the charged dust to pass through an electrical field. In the meantime, the exhaust gas desulfurizer 16 removes the sulfur oxides in the exhaust gas by using, for example, an alkaline solution absorption method, a lime slurry absorption method, a magnesium hydroxide slurry method, a spray drier method, an activated carbon absorption method, and the like. Meanwhile, the pre-processing tower 17 removes the sulfur oxides (SOx) in the exhaust gas which are not removed in the preceding step. In the meantime, the absorption tower 18 removes carbon dioxide in the exhaust gas which is not removed in the preceding steps.

The gas separation device 1 according to the above-described embodiment is applicable to the absorption tower

18. The gas G to be processed is the exhaust gas supplied from the pre-processing tower 17. The target gas component is carbon dioxide. The absorbing liquid L is an aqueous solution of an amine compound. Specifically, the absorbing liquid L is a monoethanolamine (MEA) aqueous solution, which produces carbamic acid salt/amine salt (carbamate), carbonate, bicarbonate, and the like by the absorption of carbon dioxide. The used absorbing liquid containing these salts is recovered and supplied to the stripping tower 19.

Meanwhile, the above-described gas separation device 1 is also applicable to the pre-processing tower 17. In this case, the gas G to be processed is the exhaust gas discharged from the exhaust gas desulfurizer 16. The target gas component is the sulfur oxides. The absorbing liquid L is an alkaline aqueous solution. Though the above-mentioned aqueous solution of an amine compound is applicable to the absorbing liquid L, an aqueous solution of an alkali metal hydroxide such as sodium hydroxide and potassium hydroxide is usually employed as the absorbing liquid L.

The stripping tower 19 causes the used absorbing liquid L to release the carbon dioxide that is separated from the exhaust gas. Specifically, the stripping tower 19 heats the supplied used absorbing liquid L to 100° C. or above to cause the absorbing liquid L to release the carbon dioxide. The released carbon dioxide and water vapor released at the same time are cooled and condensed. Then, the condensed water is removed from the carbon dioxide by means of gas-liquid separation, and the resultant carbon dioxide is then compressed and captured. Meanwhile, the absorbing liquid L after having released the carbon dioxide is supplied as the regenerated absorbing liquid L to the absorption tower 18 and is used again. Here, the liquid CO2 thus captured is stored in the ground or at the sea floor as carbon dioxide capture and storage (CCD), or used for other purposes.

The above-described gas separation device 1 is also applicable to the stripping tower 19. In this case, however, a heating device for heating the absorbing liquid is required. For example, by heating the absorbing liquid stored at the bottom of the processing tank 2 of FIG. 1A, carbon dioxide is released from the absorbing liquid at the bottom and rises up, whereby the packing 3 is heated as well. The absorbing liquid supplied from the upper part is heated and brought into the gas-liquid contact while the absorbing liquid flows down on the packing 3. This promotes the release of carbon dioxide in the absorbing liquid.

As described above, the target gas component to be absorbed and separated is not limited to carbon dioxide but may be other oxide gases such as NOx and SOx. Besides, any arbitrary gases may be chosen as long as such gases can be separated by the gas separation device 1 of the embodiment. In the meantime, the absorbing liquid L is not limited to the aqueous solution of an amine compound. Any arbitrary reaction liquids L may be chosen as long as such liquids are suitable for gases to be separated. For example, if the target gas component is a hydrophilic substance, then either water or a hydrophilic liquid medium can be used as the absorbing liquid. If the target gas component is a lipophilic substance, then a lipophilic liquid medium can be used as the absorbing liquid. Meanwhile, if the target gas component is an acidic substance, then either an alkaline liquid or a neutral liquid is used as the absorbing liquid. If the target gas component is an alkaline substance, then either an acidic liquid or a neutral liquid is used as the absorbing liquid. Furthermore, the gas separation device of the present invention is also applicable to a gas treatment in which the target gas component absorbed by the absorbing liquid L is eventually changed into another substance by a chemical reaction in the absorbing liquid.

FIG. 5 describes the case in which the gas separation device 1 of the embodiment is applied to the thermal power plant 10. However, the packing 3 of the present invention can achieve the gas-liquid contact efficiently with its small size and lightweight. Accordingly, the packing 3 is also applicable to packings in other devices (such as distillation towers and refinery towers) used in various chemical plants that involve physical and chemical processes such as distillation and refinement.

EXAMPLE (Evaluation of Expanded Metal Plate as Packing)

The following four specimens A to D were prepared. The specimens were evaluated by being used as packings in accordance with a test method 1 described below:

A: a 20-mesh metal mesh made of stainless (SUS304) (wire diameter: 0.2 mm, wire directions: vertical and horizontal, mesh dimensions: 1.25 mm×1.25 mm);

B: a stainless plate with its surface smoothly polished by sandblasting (average roughness: about 5 μm);

C: a specimen prepared by attaching the metal mesh of the specimen A to a surface of the stainless plate of the specimen B by using a pressure sensitive adhesive; and D: a rhombic-mesh expanded metal plate made of stainless (SUS304) (thickness T1 of material plate: 0.3 mm, center distance SW in short diagonal direction: 1.8 mm, center distance LW in long diagonal direction: 3.0 mm), used by setting the short diagonal direction vertically.

(Test Method 1)

An inclined flat plate for liquid introduction was prepared. The packing was set upright, and a lower end of the inclined flat plate was brought into contact with an upper end of the packing. Then, a liquid (water) was supplied to the inclined flat plate at a constant flow rate. Thus, the liquid was evenly introduced at a width (an introduced liquid width) of 380 mm to the upper end of the packing, and was caused to flow down on the packing. The packing was shot with a camera from its front face side (from the metal mesh side in the case of the specimen C) at a shooting angle perpendicular to the packing (i.e., horizontal). Thus, images of a liquid film formed on the packing by the liquid flowing down thereon were produced. During this operation, the shooting was repeated by sequentially reducing the flow rate of the liquid stepwise from 2.0 L/min, 1.2 L/min, 0.8 L/min, 0.4 L/min, and 0.25 L/min. Thus, the images of the liquid film representing the respective flow rates were obtained.

Using the images thus obtained, for each of the flow rates, a liquid film width (a lateral width of a portion wetted by the liquid) at a position 200 mm below the upper end of the packing was measured, and the ratio [%] of the liquid film width to the introduced liquid width (380 mm) was calculated. Thus, variations with the flow rates of the liquid were investigated. Results are shown in FIG. 4. In FIG. 4, triangular marks indicate the results of the specimen A, square marks indicate the results of the specimen B, circular marks indicate the results of the specimen C, and rhombic marks indicate the results of the specimen D.

According to FIG. 4, in the specimen A (the metal mesh) and the specimen B (the stainless plate), the ratio of the liquid film width to the introduced liquid width decreased rapidly with the reduction in flow rate of the liquid, and the lateral width of the liquid that flowed down significantly narrowed. In other words, each of the specimens became less wettable and a surface area (the gas-liquid contact area)

of the liquid film drastically decreased in each of the specimens. This is thought to be due to the fact that the liquid was apt to converge because of an influence of its surface tension when the flow rate was low. On the other hand, in the specimen D (the expanded metal plate), the ratio of the liquid film width did not decrease even when the flow rate of the liquid decreased, and the liquid that flowed down did not narrow very much. In other words, the specimen D maintained the wettability, and kept the surface area (the gas-liquid contact area) of the liquid film constant. This is understood to be because of the structure that was able to easily maintain the wetting spread of the liquid in the lateral direction as the liquid flowed down along the inclination of the continuous strands. In this regard, the expanded metal plate turned out to be an extremely advantageous packing in the light of improving the liquid absorption efficiency while reducing the flow rate, since the expanded metal plate did not require the control of the flow rate in order to maintain the gas-liquid contact area.

Meanwhile, in the specimen A, the liquid film width was narrower than those of the other specimens B to D even when the flow rate of the liquid was large. Moreover, the occurrence of a distortion and a flexure in the shape of the metal mesh was observed during the test, and a gap occurred between the lower end of the inclined flat plate and the upper end of the metal mesh. In short, it is learned that the soft metal mesh with low strength was prone to a deformation (in a bias direction in particular) due to the weight of the liquid, which made it hard for the liquid to flow down evenly as a consequence. This problem was corrected by attaching the metal mesh to the flat plate as in the specimen C, and the fact that the specimen C maintained the liquid film width when the flow rate was even lower was thought to be due to the flow along the flat plate. According to FIG. 4, the specimen C and the specimen D had substantially the same function in term of the liquid film formation, where the ratio of the liquid film width to the introduced liquid width was kept in a range of about 90% to 100%. However, considering that the specimen C needed a thickness due to its structure and also required an attachment process, it is evident that the specimen D was advantageous over the specimen C. For this reason, the expanded metal plate served as an excellent packing which was able to maintain excellent wettability by itself irrespective of the flow rate of the liquid while not requiring any reinforcing member. In this context, the expanded metal plate was a useful material that was able to contribute to reductions in size and weight of a device to be constructed by use of such a packing.

(Test Method 2)

A packing in a thin-plate shape having a lateral width of 500 mm and a length of 645 mm was vertically disposed. A string was tied to two edges at an upper end thereof, and the packing was suspended in a load cell using the string. Furthermore, a metal tube (inside diameter: 23.3 mm, length: 200 mm) was prepared as a nozzle for supplying a liquid (water). The nozzle was vertically disposed above the center of the upper end of the packing. Then, the liquid was supplied to the packing at a constant flow rate through the nozzle, and was caused to flow down (flow distance: 645 mm). The packing was shot with a camera at a shooting angle perpendicular to the packing. Thus, an image of a liquid film formed on the packing by the liquid flowing down thereon (a portion wetted by the flow of the liquid) was produced.

Using the image thus obtained, an area of the liquid film width (an area of the portion wetted by the liquid) was measured and defined as the wet area of the packing. During the measurement, the weight of the packing was also measured with the load cell, and the weight of the liquid wetting the packing was obtained by using a difference between the weights before and after the supply of the liquid. Thus, appropriateness of the value of the area of the liquid film measured from the image was confirmed.

(Influence of Thickness T1 of Material Plate)

Figure 6:
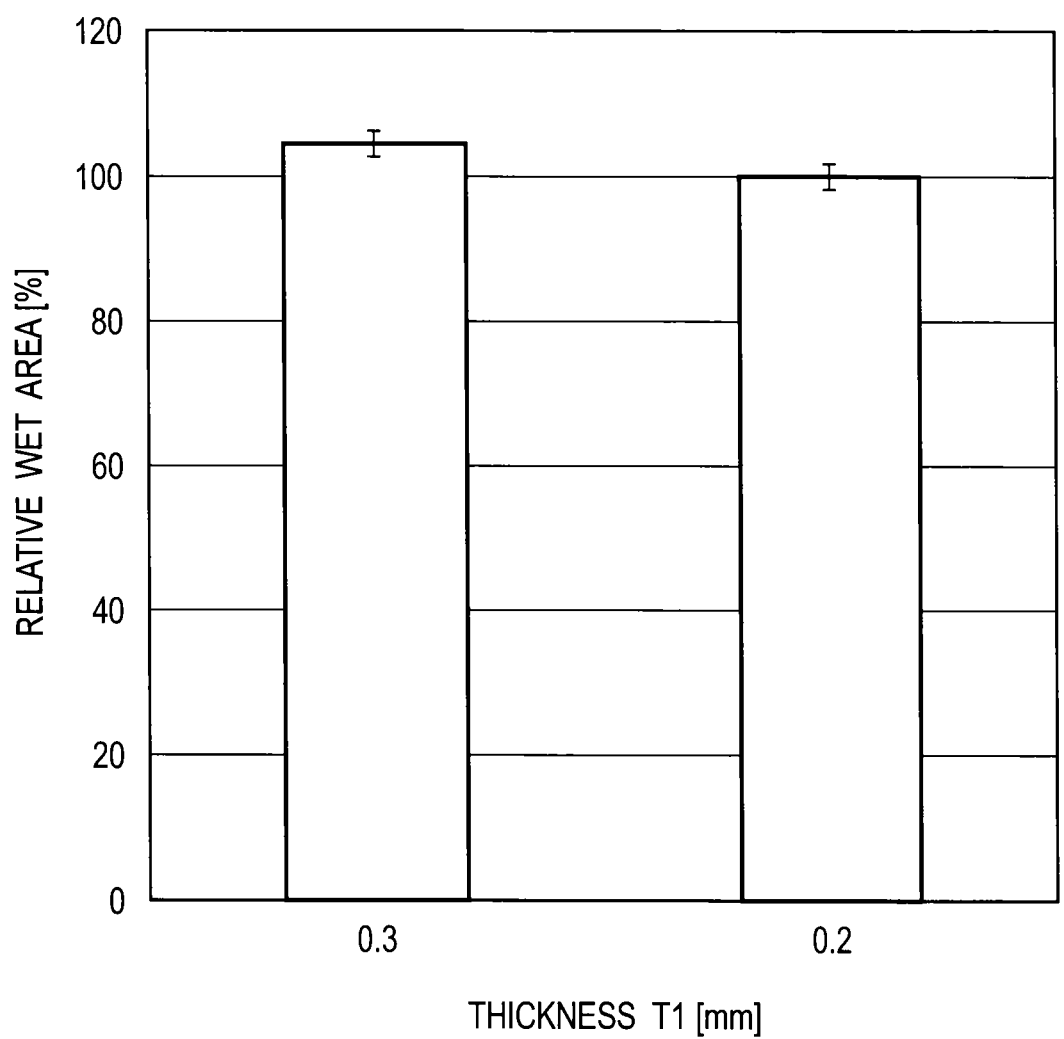
FIG. 6 is a bar graph showing variations in relative wet area depending on a thickness of a material plate of an expanded metal plate according to the embodiment of the present invention.

The following two specimens D1 and D2 were prepared. The specimens were used as packings in accordance with a test method 2 described below, and the wet areas of the specimens were measured. Measurement values thus obtained were converted into relative wet areas [%] while using the wet area of the specimen D1 as a reference (100%). FIG. 6 shows a bar graph for comparing the specimens D1 and D2 on the basis of the thicknesses T1 of their respective material plate:

D1: a rhombic-mesh expanded metal plate made of stainless (SUS304) (thickness T1 of material plate: 0.2 mm, center distance SW in short diagonal direction: 1.8 mm, center distance LW in long diagonal direction: 3.0 mm), used by setting the short diagonal direction vertically; and D2: a rhombic-mesh expanded metal plate made of stainless (SUS304) (thickness T1 of material plate: 0.3 mm, center distance SW in short diagonal direction: 1.8 mm, center distance LW in long diagonal direction: 3.0 mm), used by setting the short diagonal direction vertically.

According to FIG. 6, there occurred a difference in the wet area in an amount of about 5% between the specimen D1 in which the thickness T1 of the material plate was 0.2 mm and the specimen D2 in which the thickness T1 of the material plate was 0.3 mm. In the following evaluations of the expanded metal plates, an error in a comparative evaluation involving specimens with the different thicknesses T1 of the material plates was able to be regarded as this much. From the viewpoints of the reduction in weight and of the strength of the packings, it was preferable to use the expanded metal plates made of any of the material plates having the above-mentioned thicknesses T1.

(Evaluation 1 of Meshes of Expanded Metal Plates)

The following specimens D3, and E1 to E5 were prepared. The specimens were used as packings in accordance with the test method 2 described above, and the wet areas of the specimens were measured. Measurement values thus obtained were converted into relative wet areas [%] while using the wet area of the specimen E3 as a reference (100%):

D3: a rhombic-mesh expanded metal plate made of stainless (SUS304) (thickness T1 of material plate: 0.3 mm, center distance SW in short diagonal direction: 3.0 mm, center distance LW in long diagonal direction: 6.0 mm), used by setting the short diagonal direction vertically;

E1: a specimen prepared by attaching a rhombic-mesh expanded metal plate made of stainless (SUS304) (specimen D4, thickness T1 of material plate: 0.2 mm, center distance SW in short diagonal direction: 2.5 mm, center distance LW in long diagonal direction: 6.0 mm) to a surface of the stainless plate of the specimen B by diffusion bonding, used by setting the long diagonal direction vertically;

E2: a specimen prepared by attaching the expanded metal plate of the specimen D1 to the surface of the stainless plate of the specimen B by diffusion bonding, used by setting the long diagonal direction vertically;

E3: a specimen prepared by attaching the expanded metal plate of the specimen D1 to the surface of the stainless plate of the specimen B by diffusion bonding, used by setting the short diagonal direction vertically;

E4: a specimen prepared by attaching a rhombic-mesh expanded metal plate made of stainless (SUS304) (specimen D5, thickness T1 of material plate: 0.2 mm, center distance SW in short diagonal direction: 2.25 mm, center distance LW in long diagonal direction: 4.0 mm) to the surface of the stainless plate of the specimen B by diffusion bonding, used by setting the short diagonal direction vertically; and E5: a specimen prepared by attaching the expanded metal plate of the specimen D4 to the surface of the stainless plate of the specimen B by diffusion bonding, used by setting the short diagonal direction vertically.

Figure 7:
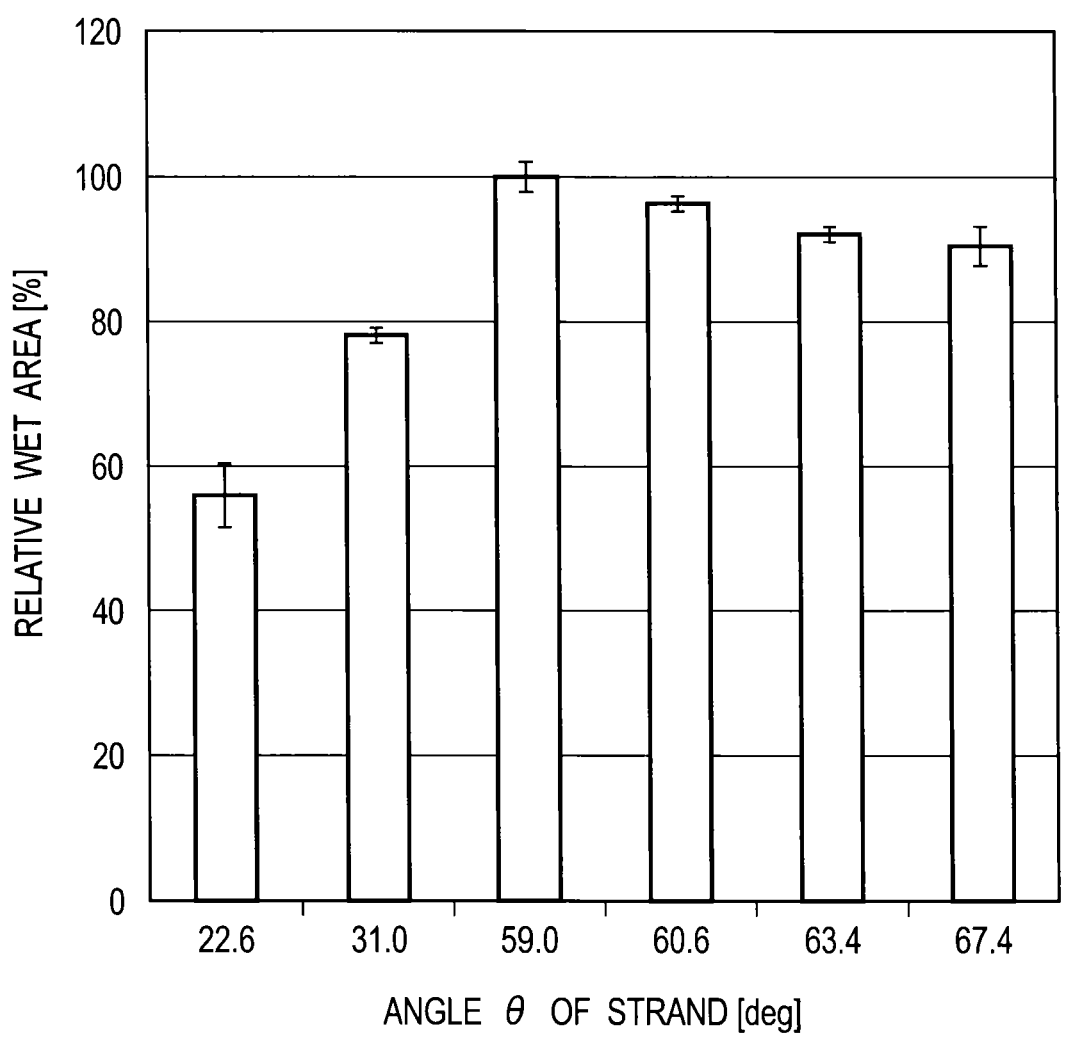
FIG. 7 is a bar graph showing a relation between an angle $\theta$ of a strand and the relative wet area of the expanded metal plate according to the embodiment of the present invention.

The angle $\theta$ ($0°<\theta\leq90°$) of inclination of each strand of the expanded metal plate to the vertical direction was found for each of the specimens D3, E1 to E5. Results are shown below. FIG. 7 shows a bar graph for investigating a relation between each angle $\theta$ thus found and the relative wet area obtained as described above:

D3: $\theta=63.4°$; E1: $\theta=22.6°$; E2: $\theta=31.0°$;
E3: $\theta=59.0°$; E4: $\theta=60.6°$; and E5: $\theta=67.4°$.

The specimen E1 and the specimen E5 used the expanded metal plates of the same mesh dimensions while changing the alignment settings of the long diagonal direction and the short diagonal direction. These expanded metal plates had the different mesh dimensions from those of the expanded metal plates used in the specimens E2 to E4 and D3. Here, the results of FIG. 7 clarify a correlation between the angle $\theta$ and the relative wet area. Accordingly, it is learned that the influence of the angle $\theta$ (the orientation of the mesh) was apparently larger than the influence of the mesh dimensions.

As a result of comparison among the specimens E1 to E5, the relative wet area rapidly increased with the increase of the angle $\theta$ of the strand from 22.6° to 59.0°. Moreover, evidently high wettability was exhibited in a range from 59.0° to 67.4° (particularly around 60°). From this result, it is obvious that the relative wet area equal to or above 80% is expected from the range of the angle $\theta$ from about 48° to 73°, and that the relative wet area equal to or above 90% is expected from the range from about 50° to 70°. Here, each of the specimens E1 to E5 was prepared by attaching the stainless plate to the expanded metal plate. Incidentally, the expanded metal plate alone also had a tendency of the relation between the angle $\theta$ and the wet area, which was similar to those of the specimens E1 to E5. The fact that the wet area reached the maximum around the angle of 60° in the case of the expanded metal plate alone was able to be confirmed in Evaluation 2 of Mesh of Expanded Metal Plate described below.

(Evaluation 2 of Mesh of Expanded Metal Plate)

Figure 8:
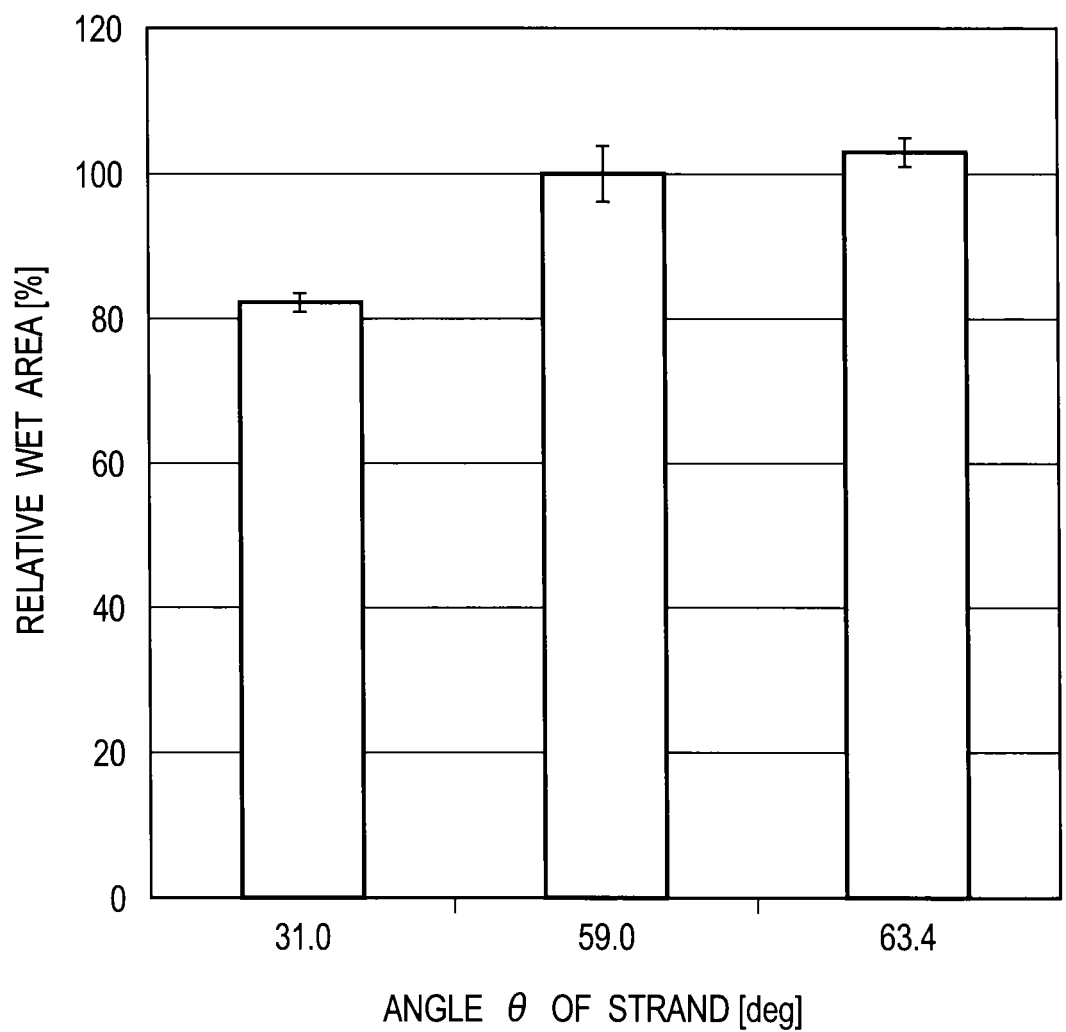
FIG. 8 is a bar graph showing a relation between the angle $\theta$ of the strand and the relative wet area of each expanded metal plate according to the embodiment of the present invention.

The following specimens D2' was prepared. The specimen was used as a packing in accordance with the test method 2 described above, and the wet area of the specimen was measured. A measurement value regarding the specimen D2' thus obtained and the measurement value regarding the specimen D3 obtained in the previous evaluation were converted into relative wet areas [%] while using the wet area of the specimen D2 measured in the previous evaluation as a reference (100%). FIG. 8 shows a bar graph for investigating a relation between the angle $\theta$ of each strand of the corresponding expanded metal plate to the vertical direction and the relative wet area for each of the specimens D2, D2', and D3. Here, the angles $\theta$ in the specimens are D2: 59.0°, D2': 31.0°, and D3: 63.4°, respectively:

D2': the expanded metal plate of the specimen D2, used by setting the long diagonal direction vertically.

FIG. 8 shows a result when the expanded metal plate was used alone. As in the case of FIG. 7, the relative wet area increased with the increase of the angle $\theta$ from about 30° to about 60°. This clearly shows a tendency similar to that of FIG. 7. This fact was able to be verified by: performing relative conversion of the results of FIG. 8 in such a way that the values of the specimen D3 ($\theta=63.4°$) coincide with each other between FIG. 7 and FIG. 8; and superimposing the results of FIG. 8 on the results of FIG. 7. When FIG. 7 was compared with FIG. 8, there was a tendency that the variation in relative wet area with the angle $\theta$ in the case of the expanded metal plate alone was emphasized by the attachment of the stainless plate. In the meantime, the angle $\theta$ where the wet area reached the maximum seemed to be slightly greater in the case of the expanded metal plate alone than in the case of attaching the stainless plate thereto. Nevertheless, there was not a large difference therebetween in terms of the angular range from which the suitable wet area was obtainable.

(Evaluation by CFD Analyses)

A flat plate, a plate with a corrugated surface (corrugation width $2a=0.6$ mm, wavelength $\lambda=2.8$ mm, projections aligned in the horizontal direction), and an expanded metal plate (thickness T1 of material plate: 0.3 mm, center distance SW in short diagonal direction: 1.8 mm, center distance LW in long diagonal direction: 3.0 mm) were used as packings (dimensions: 50 mm×60 mm). Each packing was disposed vertically, and a liquid was caused to flow down from the entire upper end of the packing at a constant flow rate. Then, a behavior of a liquid film formed by the liquid was investigated by means of simulation according to a CFD (computational fluid dynamics) analysis in each case. Results of the analyses are as follows. In the case of the flat plate, the liquid converged to the center as the liquid continued to flow down, and the liquid film width rapidly narrowed. In the case of the corrugated plate, the convergence of the fluid became more moderate than in the case of the flat plate. Nonetheless, the liquid converged to the center as the liquid flowed down to some extent. In the case of the expanded metal plate, the convergence became slower as in the case of the corrugated plate.

FIGS. 9A-9C depicts CFD analysis results of flow line distribution of the liquid flowing down on the packings. Each drawing shows the flow line distribution of the liquid in the light of a vertical cross section in the thickness direction of the liquid film formed by the liquid. Reference sign FP in FIG. 9A and FIG. 9C denotes the flat plate, while reference sign CP in FIG. 9B denotes the corrugated plate. In addition, reference sign EM in FIG. 9C denotes the expanded metal plate. As understood from these drawings, the flow line distribution of the liquid that flowed down on each of the flat plate FP and the corrugated plate CP was almost uniform. On the other hand, in the expanded metal plate EM, the flow of the liquid flowing from a projection (corresponding to a strand or a bond) to a recess (corresponding to a void inside an opening) was disturbed, whereby a vortex occurred in the flow line distribution inside the liquid film at the recess. The occurrence of such a vortex was effective for agitating and mixing the fluid. Thus, it is thought that the vortex promoted dispersion and homogenization of components contained in the liquid and thus contributed to improvement in gas absorption efficiency.

(Influence of Thickness of Expanded Metal Plate)

According to the analysis result shown in FIG. 9C, the flowing direction of the liquid was directed to the inside of the recess located immediately below the projection after the liquid flowed down on the projection. However, the next projection was located immediately below the recess. Accordingly, part of the liquid in the deflected flowing direction collided with the next projection and was reflected upward. The reflected liquid was drawn by the gravity as well as a portion of the liquid flowing down from the upper projection, thereby flowing down again. Thereafter, the liquid was reflected upward again. The above-described repetition of the reflection upward and the flow downward inside one recess was thought to be the reason why the vortex occurred.

As understood from this result, the collision of the liquid with the projection was indispensable for causing turbulence such as the vortex, and a certain difference in height between the projection and the recess was necessary for causing the collision. Meanwhile, such a difference in height was a determinant of the magnitude of the turbulence. Here, the difference corresponded to the thickness T2 (see the right-hand drawing in FIG. 1B) of the expanded metal plate. Accordingly, assuming that the turbulence had an influence on the gas absorption efficiency, it is thought that the gas absorption efficiency varied with the thickness T2 of the expanded metal plate.

Hence, a dependency of the thickness T2 of the expanded metal plate on a gas absorption performance was evaluated. In this evaluation, the following two specimens D6 and D7 including the strands inclined by such angles, from which the preferred wet area were obtainable, were prepared in consideration of the results of FIG. 7:

D6: a rhombic-mesh expanded metal plate made of stainless (SUS304) (thickness T2: 0.7 mm, thickness T1 of material plate: 0.3 mm, center distance SW in short diagonal direction: 1.8 mm, center distance LW in long diagonal direction: 3.0 mm, step width W: 0.4 mm, angle θ: 59°), used by setting the short diagonal direction vertically; and D7: a rhombic-mesh expanded metal plate made of stainless (SUS304) (thickness T2: 0.5 mm, thickness T1 of material plate: 0.3 mm, center distance SW in short diagonal direction: 1.8 mm, center distance LW in long diagonal direction: 3.0 mm, step width W: 0.4 mm, angle θ: 59°), used by setting the short diagonal direction vertically.

That is to say, only the thickness T2 of the expanded metal plates was different between the specimen D6 and the specimen D7. Here, the thickness T2 was adjustable, for example, by: forming a crease inside the bond (see the right-hand drawing in FIG. 1B) in such a way as to extend along the strand; changing an angle of the crease; twisting the bond and the strand in mutually opposite directions; and the like.

Figure 10:
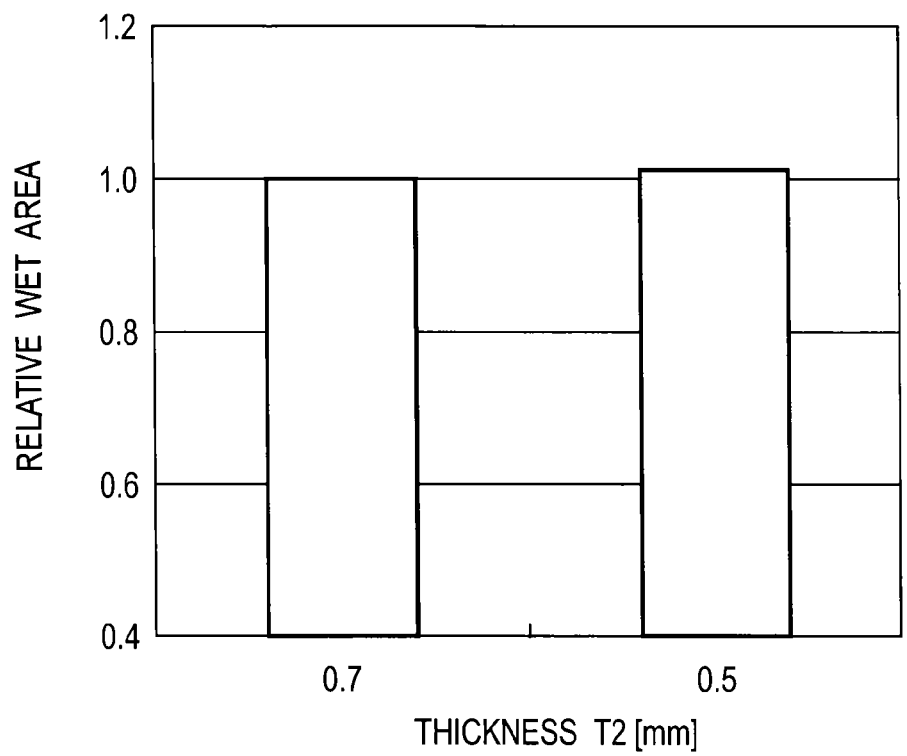
FIG. 10 is a bar graph showing variations in relative wet area depending on a thickness of the expanded metal plate according to the embodiment of the present invention.

First, the specimens D6 and D7 were respectively used as packings in accordance with the test method 2 described above, and the variation in wet area of each specimen with its thickness was measured. Measurement values thus obtained were converted into relative wet areas [%] while using the wet area of the specimen D6 as a reference (100%). FIG. 10 shows a bar graph for comparing the specimens D1 and D2 on the basis of the thickness T2. According to FIG. 10, the wet areas of the specimen D6 with the thickness T2 of 0.7 mm and the specimen D7 with the thickness T2 of 0.5 mm only showed a difference within the margin of error based on the measurement results of FIG. 6. Therefore, it was determined that the difference in the thickness T2 did not change the wet area.

Next, the packing illustrated in FIG. 2 was produced experimentally by using each of the specimens D6 and D7, and CO2 absorption performances by the packings were evaluated. In addition, the absorption performances were also compared with a CO2 absorption performance by a conventional packing. A commercially available regular packing was used as the conventional packing. The regular packing was constructed by vertically disposing multiple metal corrugated plates in parallel. Each metal corrugated plate was provided with an embossed surface. Here, an extending direction of a trough (or a peak) of each corrugated plate was inclined by 45° to the vertical direction. The troughs (or the peaks) of two adjacent corrugated plates were inclined in mutually opposite directions.

In the evaluation test, these packings were loaded into the processing tank (see FIG. 2) of test equipment. As the absorbing solution L in FIG. 2, 1 mol/L of NaOH simulant absorbing solution was supplied from the upper part of the processing tank. Meanwhile, as the gas G to be processed in FIG. 2, air containing about 1000 ppm of CO2 was supplied from the lower part of the processing tank. While the processing tank was absorbing CO2, a pressure difference between the gas G to be processed and the processed gas G' (i.e., a gas pressure loss) was measured by using a differential pressure gauge (a micro differential pressure gauge). Concurrently, the CO2 concentrations in the gas G to be processed before introduced into the processing tank and in the processed gas G' after discharged from the processing tank were respectively measured by using gas analyzers. Thus, the amount of CO2 absorption was calculated.

Figure 11:
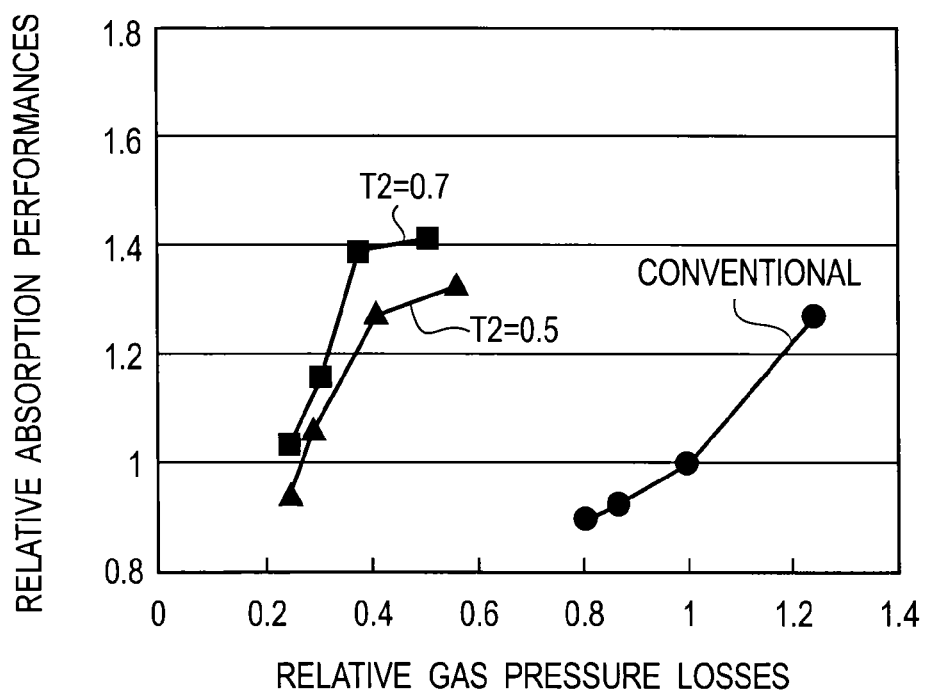
FIG. 11 is a graph showing absorption performances of the packing formed from the expanded metal plate according to the embodiment of the present invention, and an absorption performance of a conventional packing.

FIG. 11 shows results of the evaluation test. Here, the horizontal axis indicates a relative gas pressure loss value, which was based on a gas pressure loss value of the conventional packing under ordinary design conditions (superficial velocity 2 m/s, liquid-to-gas ratio (L/G) 5 L/m3). The vertical axis indicates a relative absorption amount (a relative absorption performance), which was based on a CO2 absorption amount by the conventional packing under the above-mentioned design conditions. As understood from FIG. 11, each of the packings formed from the specimens D6 and D7 showed the gas pressure loss which was about ⅓ as compared to that of the conventional packing. In other words, the packing formed from the specimen D6 or D7 was able to achieve the absorption performance equivalent to the absorption performance of the conventional packing by applying the pressure which was about ⅓ of that used for supplying the gas G to be processed to the conventional packing. Accordingly, it is possible to significantly reduce the scale of the device for supplying the gas G to be processed as well as power consumption thereof, and thus to significantly reduce a manufacturing cost and a running cost for the entire gas-liquid contact device.

Meanwhile, only the thickness T2 was different between the expanded metal plate of the specimen D6 and the expanded metal plate of the specimen D7. As understood from FIG. 11, the absorption performance increased by as much as 10% only by increasing the thickness T2 from 0.5 mm to 0.7 mm. In the meantime, there were no changes in the wet area between these specimens as shown in FIG. 10. In other words, it was found that the turbulence shown in FIG. 9C was promoted in the absorbing liquid by increasing the overall thickness of the expanded metal plate provided with the strands inclined by the angle from which the suitable wet area was obtainable, and that the absorption performance dramatically increased. The increase in absorption performance can also contribute to the significant reductions in manufacturing cost and running cost as in the case of the reduction in the gas pressure loss described above.

Needless to say, the present invention is not limited only to the above-described embodiment, and various modifications are possible within the scope not departing from the gist of the present invention.

What is claimed is:

1. A gas separation device configured to separate or capture a target gas component from a gas to be processed by: causing an absorbing liquid to flow down on a surface of a packing disposed inside a processing tank while supplying the gas to be processed containing the target gas component into the processing tank; bringing the absorbing liquid flowing down on the surface of the packing and the gas to be processed into gas-liquid contact; and thereby causing the absorbing liquid to absorb the target gas component contained in the gas to be processed, wherein the packing comprises at least one packing unit including a plurality of raised expanded metal plates which are disposed vertically and arranged in parallel, and are each provided with openings, each expanded metal plate includes strands forming the openings, each strand is inclined to the vertical direction at an angle in a range from 48° to 73°, a first thickness of each expanded metal plate is in a range from 0.5 mm to 0.7 mm, a second thickness of each expanded metal plate is in a range from 0.2 mm to 0.3 mm, the first thickness is a height of the expanded metal plate from a plane when the plate is laid on the plane, and the second thickness is a thickness of a material plate forming the expanded metal plate.

2. The gas separation device according to claim 1, further comprising:

the processing tank in which the packing is installed;

a gas introduction unit configured to introduce the gas to be processed into the processing tank; and an absorbing liquid supply unit configured to supply the absorbing liquid to the packing, wherein the plurality of expanded metal plates are arranged in parallel at regular intervals in the packing unit.

3. The gas separation device according to claim 1, wherein the packing unit comprises:

a holding member configured to hold the plurality of expanded metal plates into a state of being arranged in parallel; and spacers configured to provide regular intervals between the plurality of expanded metal plates.

4. The gas separation device according to claim 3, wherein the holding member includes a penetrating member configured to penetrate through the plurality of expanded metal plates.

5. The gas separation device according to claim 4, wherein the plurality of expanded metal plates include a through-hole to allow penetration of the penetrating member.

6. The gas separation device according to claim 5, wherein the spacers comprise erected portions formed in such a way that parts of the strands constituting the plurality of expanded metal plates at a periphery of the through-hole are bent and erected in a plate thickness direction.

7. The gas separation device according to claim 4, wherein the spacers comprise tubular members disposed between the plurality of expanded metal plates and configured to allow penetration of the penetrating member.

8. The gas separation device according to claim 3, wherein the spacers comprise erected portions formed by bending parts of the strands constituting the plurality of expanded metal plates.

9. The gas separation device according to claim 1, wherein the packing unit further comprises an annular member configured to encircle an outer periphery of the plurality of expanded metal plates and thereby integrally fix the plurality of expanded metal plates.

10. A method of capturing carbon dioxide from an exhaust gas with the gas separation device according to claim 1, comprising:

flowing down an aqueous solution of an amine compound as the absorbing liquid on the surface of the packing; and supplying the gas to be processed containing carbon dioxide as the target gas component into the processing tank.

11. The gas separation device according to claim 1, wherein a shape of the openings is rhombic or hexagonal.

12. A packing for a gas processing device to cause an absorbing liquid to absorb a target gas component contained in a gas to be processed, the packing being used in such a way as to allow the absorbing liquid to flow down on a surface of the packing in order to bring the absorbing liquid and the gas to be processed into sufficient contact, comprising:

at least one packing unit including a plurality of raised expanded metal plates which are disposed vertically and arranged in parallel, and are each provided with openings, wherein each expanded metal plate includes strands forming the openings, each strand is inclined to the vertical direction at an angle in a range from 48° to 73°, a first thickness of each expanded metal plate is in a range from 0.5 mm to 0.7 mm, a second thickness of each expanded metal plate is in a range from 0.2 mm to 0.3 mm, the first thickness is a height of the expanded metal plate from a plane when the plate is laid on the plane, and the second thickness is a thickness of a material plate forming the expanded metal plate.

13. The packing according to claim 12, wherein a shape of the openings is rhombic or hexagonal.

\* \* \* \* \*